US012812510B2

(12) United States Patent
Ramamoorthy

(10) Patent No.: US 12,812,510 B2
(45) Date of Patent: Nov. 24, 2026

(54) PIN JOIN NOTIFICATION FOR SUPPORTING IMPLICIT JOINING PERSONAL IOT NETWORK

(71) Applicant: Samsung Electronics Co., Ltd., Suwon-si (KR)

(72) Inventor: Arunprasath Ramamoorthy, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 18/479,468

(22) Filed: Oct. 2, 2023

(65) Prior Publication Data

US 2024/0114435 A1 Apr. 4, 2024

(30) Foreign Application Priority Data

Oct. 4, 2022 (IN) ............................ 202241056901
Nov. 5, 2022 (IN) ............................ 202241063279
Sep. 6, 2023 (IN) ............................ 202241056901
Sep. 6, 2023 (IN) ............................ 202342059823

(51) Int. Cl.
*H04W 48/08* (2009.01)
*H04W 12/06* (2021.01)
*H04W 48/18* (2009.01)
*H04W 84/18* (2009.01)

(52) U.S. Cl.
CPC ........... *H04W 48/08* (2013.01); *H04W 12/06* (2013.01); *H04W 48/18* (2013.01); *H04W 84/18* (2013.01)

(58) Field of Classification Search
CPC ................................ H04W 4/80; H04W 12/06
See application file for complete search history.

(56) References Cited

U.S. PATENT DOCUMENTS 10,999,893 B2 5/2021 Jain et al.
11,438,147 B2 9/2022 Afanasyeva et al.
2016/0007138 A1* 1/2016 Palanisamy ............ H04L 12/28 455/41.2

(Continued)

OTHER PUBLICATIONS

3GPP TR 23.700-78 V18.1.0 (Mar. 2023), Technical Report, 3rd Generation Partnership Project; Technical Specification Group Services and System Aspects; Study on Application layer support for Personal IoT Network; (Release 18), Mar. 2023, 90 pages.

(Continued)

*Primary Examiner* — Wen W Huang

(57) ABSTRACT

The present disclosure relates to a 5G or 6G communication system for supporting a higher data transmission rate. A method for supporting implicit joining in a PIN by a first PIN-E includes sending a PIN creation request message to a PIN apparatus (1000) to create the PIN, receiving a PIN creation response message from the PIN apparatus (1000) after creation of the PIN based on the PIN creation request message, and creating a PIN creation notification request message. The PIN creation notification request message includes at least one of a PIN ID of the created PIN, and an indication indicating that the at least one second PINE is made a member of the created PIN. Further, the method includes sending the PIN creation notification request message to at least one second PINE. Further, the method includes receiving a PIN creation notification response message from the at least one second PINE.

6 Claims, 16 Drawing Sheets

300

(56) References Cited

U.S. PATENT DOCUMENTS

| | | | | |
|---|---|---|---|---|
| 2020/0322286 | A1* | 10/2020 | Mehta | H04L 67/104 |
| 2020/0323030 | A1* | 10/2020 | Mehta | H04W 84/18 |
| 2021/0368341 | A1 | 11/2021 | Liao | |
| 2021/0368581 | A1 | 11/2021 | Shan | |
| 2023/0078802 | A1* | 3/2023 | Wang | G06Q 30/0633 705/14.11 |
| 2024/0314534 | A1* | 9/2024 | Shi | H04W 76/14 |
| 2025/0119858 | A1* | 4/2025 | Zhang | H04W 88/14 |
| 2025/0159589 | A1* | 5/2025 | Zhang | H04W 48/08 |
| 2025/0212269 | A1* | 6/2025 | Liu | H04W 12/009 |
| 2025/0219837 | A1* | 7/2025 | Liang | H04L 9/3226 |
| 2025/0227781 | A1* | 7/2025 | Liu | H04W 76/11 |

OTHER PUBLICATIONS

3GPP TS 23.542 V18.0.0 (Jun. 2023), Technical Specification, 3rd Generation Partnership Project; Technical Specification Group Services and System Aspects; Application layer support for Personal IoT Network; (Release 18), Jun. 2023, 103 pages.

International Search Report and Written Opinion of the International Searching Authority dated Jan. 9, 2024, in connection with International Application No. PCT/KR2023/015064, 7 pages.

3GPP TR 23.700-88 V1.0.0 (Sep. 2022), Technical Report, 3rd Generation Partnership Project; Technical Specification Group Services and System Aspects; Study on architecture enhancements for Personal IoT Network (PIN) (Release 18), Sep. 2022, 163 pages.

Communication pursuant to Rule 164(1) EPC dated Nov. 10, 2025, in connection with European Application No. 23875168.9, 20 pages.

Examination report dated Oct. 24, 2025, in connection with Indian Application No. 202241056901, 7 pages.

3GPP TR 23.700-78 V0.5.0 (Aug. 2022), Technical Report, 3rd Generation Partnership Project; Technical Specification Group Services and System Aspects; Study on Application layer support for Personal IoT Network (Release 18), Aug. 2022, 59 pages.

3GPP TR 23.700-78 V0.6.0 (Oct. 2022), Technical Report, 3rd Generation Partnership Project; Technical Specification Group Services and System Aspects; Study on Application layer support for Personal IoT Network (Release 18), Oct. 2022, 74 pages.

3GPP TR 22.859 V1.0.0 (Mar. 2021), Technical Report, 3rd Generation Partnership Project; Technical Specification Group Services and System Aspects; Study on Personal Internet of Things (PIoT) networks (Release 18), Mar. 2021, 36 pages.

Supplementary European Search Report dated Feb. 2, 2026, in connection with European Patent Application No. 23875168.9, 18 pages.

Examination Report dated May 19, 2026, in connection with Indian Application No. 202342059823, 7 pages.

* cited by examiner

PIN JOIN NOTIFICATION FOR SUPPORTING IMPLICIT JOINING PERSONAL IOT NETWORK

CROSS REFERENCES TO RELATED APPLICATIONS

This application is based on and derives the benefit of Indian Provisional Application 202241056901 filed on Oct.4, 2022, Indian Provisional Application 202241063279 filed on Nov. 5, 2022, Indian Non-Provisional Patent Application No. 202241056901 filed on Sep. 6, 2023, and Indian Non-Provisional Patent Application No. 202342059823 filed on Sep. 6, 2023, the contents of which are incorporated herein by reference.

BACKGROUND

1. Field

The embodiments herein relate to manage a Personal IoT Network (PIN). More particularly relates to a method for PIN join notification for supporting implicit joining the PIN.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In general, a fifth generation (5G) system supports a mechanism for a network operator or an authorized $3^{rd}$ party (e.g., a PIN user or the like) to create, remove and manage a PIN. The PIN is created by a PIN Element with Management Capability (PEMC) PIN Element (PINE). The PEMC PINE is the PIN element with management capability. The PEMC creates a PIN and carry a list of PIN elements that will be joined the PIN once the PIN is created. On getting a PIN creation request from the PEMC, a PIN server creates the PIN and also implicitly joins the PIN elements specified by the PEMC if they are authorized to join the PIN. The PIN elements are already a part of the PIN being created and the PIN elements do not have to join the PIN explicitly. However, the existing methods do not provide a procedure of a PIN elements notification procedure that the PIN elements are already the part of the PIN so that the PIN elements can avoid sending a join request to the PEMC or the PIN server. Thus, leading a resource wastage in the PIN.

Furter, the PIN includes the PIN Elements that communicate using PIN direct connection or direct network connection and is managed locally (using the PEMC). Examples of the PINs include networks of wearables, smart home and smart office equipment. Using the PEMC, the PIN elements have access to 5G network services and can communicate with PIN elements that are not within range to use PIN direct connection. The PEMC provides a means for an authorized administrator to configure and manage the PIN. In conventional systems and methods, the PIN may have more than one the PEMC. For example in case of larger PIN, the PIN admin or the PIN owner or a Public Land Mobile Network (PLMN) may configure the PIN with multiple PEMCs in order to cover a larger area. There is no procedure of how multiple PEMCs can exists in the PIN and what role they can be assigned is not specified.

Thus, it is desired to address the above mentioned disadvantages or other shortcomings or at least provide a useful alternative.

The principal objective of the embodiment is to provide a method and a PIN with a notification mechanism that determines and notifies PIN elements that the PIN elements are already a part of the PIN and avoid an explicit join procedure if the PIN element is already made part of the newly created PIN.

Another objective of the embodiment is to notify individual PIN elements that the PIN is created and the corresponding PIN element is already part of the PIN. When the PIN elements are notified, they are aware that the PIN is created and they are already part of it and no need to do explicit PIN join procedures. Hence, the PIN elements avoid the execution of redundant procedures of PIN discovery and PIN join.

Another objective of the embodiment is to manage multiple PEMCs, when the multiple PEMCs present in the PIN.

Another objective of the embodiment is to utilize the PEMCs to perform PIN management operations by the PIN admin, PIN owner or any authorized user.

Another objective of the embodiment is to provide that a PIN server assigns a primary role or a secondary role to the PIN element registering as a PEMC.

Another objective of the embodiment is to provide a configuration information in a PIN profile indicating which PIN elements can be assigned with the role of a primary PEMC (PEMC-P) or secondary PEMC (PEMC-S).

Another objective of the embodiment is to provide an extensions to a PIN dynamic profile information to carry a details of whether the PINE is assigned with the role of the PEMC-P or the PEMC-S against each PIN element authorized as the PEMC.

SUMMARY

Accordingly, the embodiments herein provide a method for supporting implicit joining in a PIN. The method includes sending, by a first PIN Equipment (PIN-E), a PIN creation request message to a PIN apparatus to create the PIN. Further, the method includes receiving, by the first PINE, a PIN creation response message from the PIN apparatus after creation of the PIN based on the PIN creation request message. Further, the method includes creating, by the first PINE, a PIN creation notification request message. The PIN creation notification request message includes at least one of a PIN ID of the created PIN, and an indication indicating that the at least one second PINE is made a member of the created PIN. Further, the method includes sending, by the first PINE, the PIN creation notification request message to at least one second PINE. Further, the method includes receiving, by the first PINE, a PIN creation notification response message from the at least one second PINE.

In an embodiment, the at least one second PINE receiving the PIN creation notification request message with joined indication does not join the created PIN by issuing a PIN join request as the at least one second PINE is already made a member of the created PIN.

In an embodiment, the PIN creation request message includes at least one of security credentials of the at least one second PEMC received during authorization procedure, a list of PIN elements to be included in the PIN, and a PINE identifier including at least one of a GPSI, a PIN client ID, a PINE location, and a PIN client profile information.

In an embodiment, the PIN creation response message includes at least one of a PIN ID of the created PIN, a list of PIN elements and corresponding identifier authorized and made as member of the created PIN when the PIN creation request message includes a list of PIN elements to be included in the PIN.

In an embodiment, the PIN creation notification request message includes at least one of a PIN ID of the created PIN, and an indication indicating that the at least one second PINE is made a member of the created PIN.

In an embodiment, the first PINE is a PEMC and the at least one second PINE is a PEGC or normal PINE.

Accordingly, the embodiments herein provide a first PIN-E for supporting implicit joining in a PIN. The first PIN-E includes an implicit join support controller coupled to a memory and a processor. The implicit join support controller is configured to send a PIN creation request message to a PIN apparatus to create the PIN. Further, the implicit join support controller is configured to receive a PIN creation response message from the PIN apparatus after creation of the PIN based on the PIN creation request message. Further, the implicit join support controller is configured to create a PIN creation notification request message. The PIN creation notification request message includes at least one of a PIN ID of the created PIN, and an indication indicating that the at least one second PINE is made a member of the created PIN. Further, the implicit join support controller is configured to send the PIN creation notification request message to at least one second PINE. Further, the implicit join support controller is configured to receive a PIN creation notification response message from the at least one second PINE.

Accordingly, the embodiments herein provide a method for supporting multiple PEMC as part of PIN management in a PIN. The method includes storing, by a PIN apparatus, a PIN profile. The PIN profile includes a list of identifiers of the one or more PINEs which that are authorized to act as PEMC and take a role of a primary PEMC (PEMC-P) or a secondary PEMC (PEMC-S). Further, the method includes receiving, by the PIN apparatus, a PINE registration request message from a PINE. Further, the method includes determining, by the PIN apparatus, whether the PINE is authorized to act as PEMC and take a role of the PEMC-P or the PEMC-S based on the stored PIN profile. Further, the method includes determining, by the PIN apparatus, whether the PIN is created. In an embodiment, the method includes assigning the PINE the role of the PEMC-P when the PIN is not created and the PINE is authorized to act as the PEMC and take the role of the PEMC-P. In another embodiment, the method includes assigning the PINE the role of the PEMC-S when the PIN is created irrespective of the PINE is authorized to act as the PEMC and take the role of the PEMC-P.

In an embodiment, the method includes creating or updating, by the PIN apparatus, a dynamic PIN profile with the details of the PIN elements which are assigned with the PEMC role and whether the PEMC role is a secondary or a primary. Further, the method includes storing, by the PIN apparatus, the created dynamic PIN profile or the updated dynamic PIN profile.

In an embodiment, the PINE registration request message includes at least one of security credentials of the PINE received during authorization procedure of the of the PINE, a GPSI of the PINE, a MAC address of the PINE, vendor name of the PINE, device description of the PINE, and an address of the PINE.

In an embodiment, the method includes receiving, by the PEMC-S, a message from a PIN user or PIN owner or PIN admin to perform at least one PIN management operation. Further, the method includes creating, by the PEMC-S, a PIN management operation request message including the least one PIN management operation. Further, the method includes sending, by the PEMC-S, the PIN management operation request message to the PEMC-P. Further, the method includes receiving, by the PEMC-S, a PIN management operation response message from the PEMC-P containing the status or result of the PIN management operation request.

In an embodiment, the method includes receiving, by the PEMC-P, the PIN management operation request message from the PEMC-S. Further, the method includes determining, by the PEMC-P, whether the PEMC-S is authorized as PEMC-S to perform the operation upon receiving the PIN management operation request message. Further, the method includes performing, by the PEMC-P, the at least one PIN management operation when the PEMC-S is authorized as the PEMC-S. Further, the method includes sending, by the PEMC-P, the PIN management operation response message to the PEMC-S comprising status or result of the PIN management operation request.

Accordingly, the embodiments herein provide a method for supporting multiple PEMC as part of PIN management in a PIN. The method includes receiving, by a PEMC-S, a message from a PIN user or PIN owner or PIN admin to perform at least one PIN management operation. Further, the method includes creating, by the PEMC-S, a PIN management operation request message comprising the least one PIN management operation. Further, the method includes sending, by the PEMC-S, the PIN management operation request message to a PEMC-P. Further, the method includes receiving, by the PEMC-S, a PIN management operation response message from the PEMC-P comprising status or result of the PIN management operatEion request.

In an embodiment, the method includes receiving, by the PEMC-P, the PIN management operation request message from the PEMC-S. Further, the method includes determining, by the PEMC-P, whether the PEMC-S is authorized as PEMC-S to perform the operation upon receiving the PIN management operation request message. Further, the method includes performing, by the PEMC-P, the at least one PIN management operation when the PEMC-S is authorized as the PEMC-S. Further, the method includes sending, by the PEMC-P, the PIN management operation response message to the PEMC-S comprising the status or result of the PIN management operation request.

In an embodiment, the PIN management operation request message includes a PIN client ID of the PEMC-S.

In an embodiment, the at least one PIN management operation includes a PIN element removal operation, a PIN element addition operation, a PIN deletion operation, and a PIN configuration update operation.

Accordingly, the embodiments herein provide a PIN for supporting multiple PEMC as part of PIN management. The PIN includes a PIN apparatus connected to a plurality of PINEs. The PIN apparatus includes a memory storing the PIN profile, where the PIN profile includes a list of identifiers of the one or more PINEs which that are authorized to act as PEMC and take a role of a PEMC-P or a PEMC-S, a processor, and a multiple PEMC support controller, coupled to the memory and the processor. The multiple PEMC support controller is configured to determine whether the first PINE is authorized to act as PEMC and take a role of the PEMC-P or the PEMC-S based on the stored PIN profile. Further, the multiple PEMC support controller is configured to determine whether the PIN is created. Further, the multiple PEMC support controller is configured to assign the first PINE the role of the PEMC-P when the PIN is not created and the first PINE is authorized to act as the PEMC and take the role of the PEMC-P. Further, the multiple PEMC support controller is configured to assign the first PINE the role of the PEMC-S when the PIN is created irrespective of the first PINE is authorized to act as the PEMC and take the role of the PEMC-P. Further, the multiple PEMC support controller is configured to create a dynamic PIN profile and store the information of which PIN elements are authorized as PEMC and whether they are assigned with role of PEMC-P or PEMC-S. Further, the multiple PEMC support controller is configured to store the dynamic PIN profile in the memory of the PIN apparatus.

In an embodiment, the PEMC-S includes a multiple PEMC support controller coupled to a memory and a processor. The multiple PEMC support controller is configured to receive a message from a PIN user or PIN owner or PIN admin to perform at least one PIN management operation. Further, the multiple PEMC support controller is configured to create a PIN management operation request message including the least one PIN management operation. Further, the multiple PEMC support controller is configured to send the PIN management operation request message to the PEMC-P. Further, the multiple PEMC support controller is configured to receive a PIN management operation response message from the PEMC-P.

In an embodiment, the PEMC-P includes a multiple PEMC support controller coupled to a memory and a processor. The multiple PEMC support controller is configured to receive the PIN management operation request message from the PEMC-S. Further, the multiple PEMC support controller is configured to determine whether the PEMC-S is authorized as PEMC-S to perform the operation upon receiving the PIN management operation request message. Further, the multiple PEMC support controller is configured to perform the at least one PIN management operation when the PEMC-S is authorized as the PEMC-S. Further, the multiple PEMC support controller is configured to send the PIN management operation response message to the PEMC-S.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The present disclosure is illustrated in the accompanying drawings, throughout which like reference letters indicate corresponding parts in the various figures. The embodiments herein will be better understood from the following description with reference to the drawings, in which.

Figure 1:
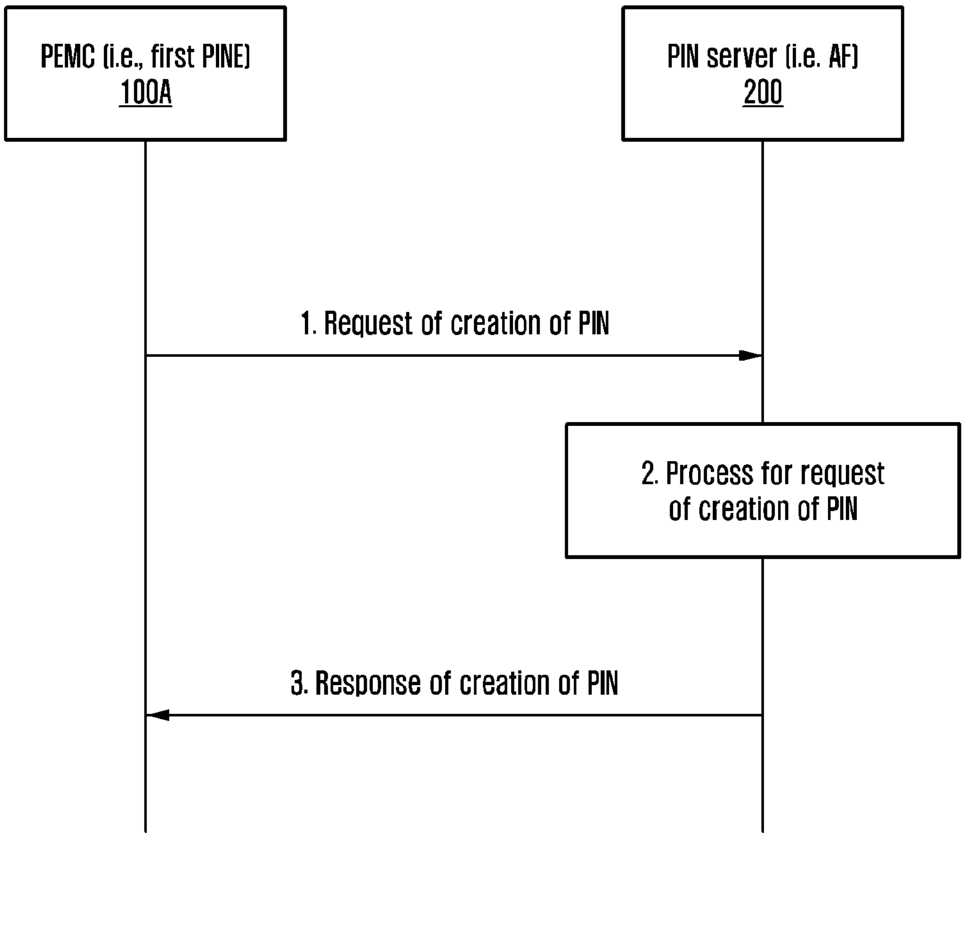
FIG. 1 illustrates a flow diagram of a PIN creation procedure.

It may be noted that to the extent possible, like reference numerals have been used to represent like elements in the drawing. Further, those of ordinary skill in the art will appreciate that elements in the drawing are illustrated for simplicity and may not have been necessarily drawn to scale. For example, the dimension of some of the elements in the drawing may be exaggerated relative to other elements to help to improve the understanding of aspects of the present disclosure. Furthermore, the one or more elements may have been represented in the drawing by conventional symbols, and the drawings may show only those specific details that are pertinent to the understanding the embodiments of the present disclosure so as not to obscure the drawing with details that will be readily apparent to those of ordinary skill in the art having benefit of the description herein.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Definitions of the terms used in the patent disclosure as follows:

PIN (Personal IoT Network): The PINs provide local connectivity between User Equipment s (UEs) and/or non-Third Generation Partnership Project (3GPP) devices. The UE can be, for example, but not limited to a laptop, a smart phone, a desktop computer, a notebook, a Device-to-Device (D2D) device, a vehicle to everything (V2X) device, a foldable phone, a smart TV, a tablet, an immersive device, and an internet of things (IoT) device. The PIN consists of PIN Elements (PINEs) that communicate using PIN direct Connection or direct network connection and is managed locally (using a PIN Element with Management Capability).

PINE (PIN Element): PIN Elements are UEs and/or non-3GPP devices which form part of the PIN.

PEMC (PIN Element with Management Capability): PIN Element which have the capability to provide means for an authorised administrator to configure and manage a PIN. The PEMC are the UEs and/or the non-3 GPP devices.

PEGC (PIN Element with Gateway Capability): The PEGC provide means to PIN elements to register and access 5G network services. The PEGC can also help in communication between 2 PIN elements that are not within the range to use direct communication. The PEGC are the UEs and/or the non-3 GPP devices.

PIN-ID: Unique identifier associated with the PIN.

PIN direct connection: The connection between two PIN Elements without any 3GPP RAN or a core network entity in the middle.

In conventional methods and systems, a preconfigured UE or the UE with a pre-discovered address such as IP address, FQDN, URI of a PIN server is provided. The preconfigured UE sends a PIN creation request to the PIN server to request to create a PIN. A PEMC requests to create the PIN including a plurality of PIN elements that has already communicated with PEMC. The PEMC sends the PIN creation request including PIN elements information. Upon receiving the request, the PIN server performs an authorization check to verify whether the PEMC has authorization to perform the operation. The PIN server sends a successful response to PEMC that comprise a newly assigned PIN ID to indicate the PIN. If the PIN creation request fails, the PIN server gives the failure response to indicates that indicates the cause of PIN creation request failure. If there are no other PIN elements in the PIN creation request and the PIN creation is successful, the PEMC indicates the PEMC to be the PEGC.

Accordingly, the embodiments herein provide a method for supporting implicit joining in a PIN. The method includes sending, by a first PIN-E, a PIN creation request message to a PIN apparatus to create the PIN. Further, the method includes receiving, by the first PINE, a PIN creation response message from the PIN apparatus after creation of the PIN based on the PIN creation request message. Further, the method includes creating, by the first PINE, a PIN creation notification request message. The PIN creation notification request message includes at least one of a PIN ID of the created PIN, and an indication indicating that the at least one second PINE is made a member of the created PIN. Further, the method includes sending, by the first PINE, the PIN creation notification request message to at least one second PINE. Further, the method includes receiving, by the first PINE, a PIN creation notification response message from the at least one second PINE.

In an embodiment, the PIN is created based on a request from the PEMC. The PIN elements that are part of the PIN creation request and become members of the PIN implicitly during the PIN creation process. The method includes notifying or indicating the PIN elements that become the members of the PIN while PIN creation. The PIN server notifies an individual PIN elements that the PIN elements joined with the PIN by sending the PIN join notification containing the list of PIN elements that are authorized and made part of the PIN to the PEMC. The PEMC generates and sends the notification to the individual PIN elements. The PEMC generating the PIN creation notification with joined indication to the PIN elements on receiving the successful response for the PIN creation request. The PIN server notifies the individual PIN elements that the PIN elements are joined the PIN by sending the PIN join notification to the PEGC and PEGC generating and forwarding the notification to the individual PIN elements.

In an embodiment, the multiple PEMCs in the PIN, at any given point of time only one PIN element will be considered active/primary and is responsible for managing the PIN. Any operations related to the PIN management like creation/modification/deletion of PIN, authorizing/de-authorizing the PIN elements, removing the PIN elements from PIN etc., may be performed and managed by only one PEMC which is considered as primary PEMC. All other PEMCs shall not be allowed to perform PIN management operation. Though the PIN is allowed to contain only one active or primary PEMC, the PEMC-Ss can be used by the PIN user or PIN owner to perform certain PIN management operations. The PIN owner/PIN admin need not always use the UE containing the PEMC which is designated as active or primary to perform certain PIN management operations. For example in case of a multi storey building the active or primary PEMC might be in any floor and the PIN owner may require to manage the PIN using a PEMC UE which is accessible easily to him. The method to manage multiple PEMCs is described and the PIN owner or PIN admin can make use of other PEMCs if present in PIN to perform PIN management operation is not specified.

In an embodiment, the procedure for PIN element registering with the PIN server as PEMC is disclosed. The present disclosure to extend an existing procedure with the following changes is described:

In an embodiment, the PIN server on receiving the registration request from the PIN element as the PEMC checks with a 5GS whether the UE identified by a GPSI is allowed to function as the PEMC. The registration request includes the PIN ID(s) for which the PIN element is intending to register as the PEMC. If allowed, the PIN server verifies if the PIN(s) has already been created.

In an embodiment, if the PIN is already created, then the currently registering PEMC cannot take the role of PEMC since there is already a PIN element assigned with the role of PEMC for the PIN. In this case, the PIN element is assigned with the role of PEMC-S.

In an embodiment, if the PIN is not created, then the PIN server can assign the role of PEMC-P to the PIN element.

In an embodiment, the PIN server shall decide on whether the PIN Element can be assigned with the PEMC-P role or PEMC-S role based on a configuration information present in the PIN profile.

In an embodiment, inclusion of PIN IDs as part of the PEMC registration procedure. The PIN IDs can be provisioned at the PIN Element in prior by the PIN admin/owner or the PIN element might be rebooting and has already cached the PIN IDs for which it is assigned with the role of PEMC. Single PIN element may register to multiple PINs in single registration request as PEMCs. The PIN server shall respond to the registration request and the response shall contain whether the PIN Element is allowed to be PEMC for each of the PIN and if allowed, whether it is assigned with primary or secondary role. The PIN server deciding on whether the PIN element can be assigned with the primary (PEMC-P) or secondary (PEMC-S) based on the configuration information present in the PIN profile or it can decide based on the first cum first serve basis. In case the PIN element is assigned with the role of PEMC-S, the PIN server shall return the details of the PEMC-P in the registration response. These details can include the PIN element ID, reachability information (IP address or FQDN). Also if the PIN already has PEMC-Ss assigned, the PIN server can include the details of these PEMC-S also. The PIN server may notify other PIN elements including PEMC-P and the PEMC-Ss about the new PIN element assigned with the PEMC-S role and its details in case if the PIN has already been created before the registration request. The PIN element can also request whether it wants to function as primary (PEMC-P) or secondary (PEMC-S) as part of the registration request.

The proposed method can be used to notify the individual PIN elements that the PIN is created and the corresponding PIN element is already part of the PIN. When the PIN elements are notified, they are aware that the PIN is created and they are already part of it and no need to do explicit PIN join procedures. Hence, the PIN elements can avoid the execution of redundant procedures of PIN discovery and PIN join. Also, the PIN elements reduce the resource wastage.

Based on the proposed method, each PEMC is assigned with the role of primary PEMC or the secondary PEMC. Also, the proposed method is clearly specified what actions and procedures can be executed by the primary PEMC and the secondary PEMC. Any operations related to the PIN management like creation deletion of PIN, modification deletion of PIN and the deletion of PIN, authorizing the PIN elements, de-authorizing the PIN elements, removing the PIN elements from PIN etc., may be performed and managed by only primary PEMC. All other PEMCs shall not be allowed to perform these PIN management operations. Though the PIN is allowed to contain only one active or primary PEMC, the secondary PEMCs can be used by the PIN user or PIN owner to perform certain PIN management operations. The PIN owner/PIN admin need not always use the UE containing the PEMC which is designated as active or primary to perform certain PIN management operations. For example in case of a multi-story building, the active or primary PEMC might be in any floor and the PIN owner may require to manage the PIN using a PEMC UE which is accessible easily to him/her.

The proposed method can be implemented in case of a larger PIN like hospitals, recreation centers, etc. where more than one PEMC is used for efficient management of the PIN by the PIN admin or the PIN owner. Though, only PIN element can be assigned with the role of primary PEMC the PIN admin/owner is more or less transparent to this limitation and the PIN admin or the PIN owner can use the secondary PEMC to perform most of the PIN management operations. The PIN owner or PIN admin do not have to run to the primary PEMC equipment to always perform the PIN management operations.

Referring now to the drawings and more particularly to FIGS. 2 through 16, where similar reference characters denote corresponding features consistently throughout the figure, these are shown preferred embodiments.

FIG. 1 illustrates a flow diagram of a PIN creation procedure. Considering the conventional methods and system, currently 3$^{rd}$ Generation Participation Project (3GPP) TR 23.700-78 has a procedure for the creation of PIN by the PEMC and also specifies that the PEMC can include a list of PIN elements that will be part of the created PIN. With the mechanism, individual PIN elements do not have to explicitly join the PIN by issuing PIN join request. For this to work, the PIN elements shall already have an application layer connection with the PEMC (100A). The PIN server (200) process the PIN creation request and creates the PIN (300) including the PIN elements specified by the PEMC (100A) in the PIN creation request.

Pre-conditions for the creation request are as follows:

1) The UE (i.e., PINE) has been pre-configured or has discovered an address (e.g. IP address, Fully Qualified Domain Name (FQDN), URI) of the PIN server (200).
2) The UE identifier or PIN client Identifier is available.
3) The PINE has been authorized to communicate with the PIN server (200).
4) The UE or PINE has already received the role of the PEMC (100A) from the PIN server (200).

At step 1, the UE or the PINAPP that is the role of the PEMC (100A) sends a PIN creation request to the PIN server (200) to request to create a PIN. The PIN creation request includes the security credentials of the UE or the PINE received during a PINE authorization procedure and may include the UE identifier such as GPSI, PIN client ID, UE location and PIN client profile(s) information. The PEMC (100A) can also indicate the PIN service that the PIN can provide to PIN server (200). The PEMC can request to create a PIN that including other PIN elements that has already communicated with PEMC. If so, the PEMC (100A) sends the PIN creation request including the PIN elements information for example, UE identifier such as GPSI, PIN client ID, UE location and PIN client profile(s) information. If there are no other PIN elements in the request, the PEMC (100A) requests to create the PIN that including only one element that the PEMC. In order to save the procedure of several PEMCs to be involved into the certain PIN as individual PEMC, the PEMC can have the additional PEMC GPSIs in the PIN create request, to indicate additional PEMCs that are allowed to manage the PIN. The procedure doesn't have conflict with that other PEMC requests to join the certain PIN and becomes PEMC separately. At step 2, upon receiving the request, the PIN server (200) performs an authorization check to verify whether the PEMC has authorization to perform the operation. At step 3, the PIN server (200) sends a successful response to PEMC (100A), which includes a newly assigned PIN ID to indicate the PIN. If the PIN creation request fails, the PIN server (200) should give the failure response to indicates that indicates the cause of PIN creation request failure. If there are no other PIN elements in the PIN creation request and the PIN creation is successful, the PIN server (200) indicates the PEMC to be the PEGC (100B). The PINE who has already had the role of PEMC can also has the role of PEGC (100B). If the PEGC (100B) is indicated, the PIN server (200) sends the PIN client ID (that represents the PEGC (100B)), assigned IP address or a port number in successful response to PEMC. Further, the PIN server (200) also sends the PEGC (100B) information about access control in the response, including access control information. The access control information includes: user name, account, service set identifier (SSID), and Basic Service Set Identifier (BSSID). All the information is used by the PIN elements in the PIN (300) to access the 5G or access other application outside of the PIN (300). After the procedure above, the PIN server (200) creates the PIN with PEMC (100A) and (PEGC (100B)) and other accepted PIN elements in the PIN.

Figure 2:
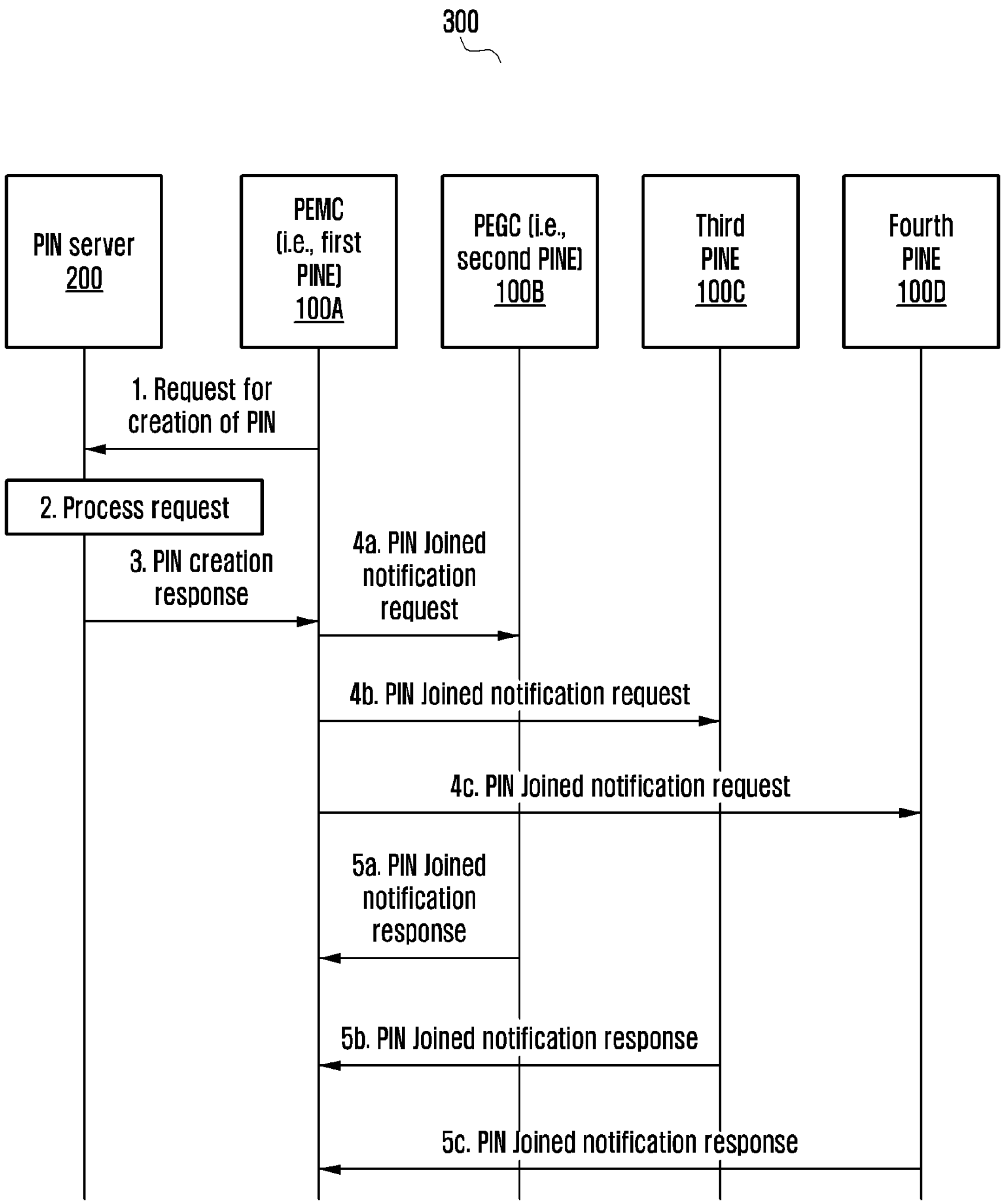
FIG. 2 illustrates a flow diagram of a PIN server indicating PIN elements for PIN join notification and support implicit joining, according to the embodiments as disclosed herein.

FIG. 2 illustrates a flow diagram of the PIN server (200) indicating the PIN elements for PIN join notification and support implicit joining, according to the embodiments as disclosed herein.

When the PIN (300) is created as per the request from the PEMC (100A), the PIN elements which are part of the PIN creation request and became members of the PIN implicitly during the PIN creation process should be notified about this. The proposed method can be used for indicating/notifying the PIN elements which became the members of the PIN (300) while PIN creation. In an embodiment, the PIN server (200) indicates the PIN elements which are authorized and accepted as members of the PIN (300) in the PIN creation response and the PEMC (100A) notifying the PIN elements with PIN joined notification request. In another embodiment, the PIN server (200) notifies the individual PIN elements that they are joined the PIN by sending the PIN join notification containing the list of PIN elements which are authorized and made part of the PIN to the PEMC (100A) and the PEMC (100A) generating and sending the notification to the individual PIN elements. In another embodiment, the PEMC (100A) generates the PIN creation notification with the joined indication to the PIN elements on receiving the successful response for the PIN creation request. In another embodiment, the PIN server (200) notifies the individual PIN elements that they are joined the PIN (100A) by sending the PIN join notification to the PEGC (100B) and the PEGC (100B) generating and forwarding the notification to the individual PIN elements. In order for the implicit join request by the PEMC (100A) to work, the PIN client profiles are already available with the PEMC (100A) and PIN server (200) so that the PIN server (200) and the PEMC (100A) knows the capabilities and services offered by the PIN elements and also the list of services they want to consume. When the PIN element has established the application layer communication with the PEMC (100A), the PIN (100) can share the PIN client profile to the PEMC (100A) which can further be shared with the PIN server (200). These profiles can be assigned unique identifier so that they can be referred using that identifier. Alternatively the PEMC (100A) can share the PIN client profiles of each PIN elements as part of the PIN creation request if the PIN client profiles are not available at the PIN server (200). The pre-condition for the PIN join indication is as described, the PINE-1 is authorized as the PEMC (100A) and PINE-2 is authorized as PEGC (100B). The PINE-2, PINE-3 and PINE-4 has the application layer connection with the PEMC (PINE-1) (100A). The steps to perform the PIN join indication is as follows.

Existing steps in the PIN creation procedure as described in 3GPP TR 23.700-78. At step 1 and step 2, the PIN creation request carries the list PIN element identifier of other PIN elements which needs to be joined as the member of the PIN being created and the PIN client profile identifiers of each PIN elements. At step 3, the PIN server (200) sends a successful response to PINE-1 (PEMC), which includes a newly assigned PIN ID to indicate the PIN. The response also includes the list of PIN elements and their identifier which are authorized by the PIN server (200) and are part of the newly created PIN. At step 4*a*-step 4*c*, on receiving the PIN creation response from the PIN server (200), the PINE-1 (PEMC) (100A) generates the PIN joined notification request and sends the PIN joined notification request to the PIN elements which are authorized and made member of the PIN as received in the PIN creation response (step 3). The notification contains the PIN ID of the PIN created and the PIN identifier of the PIN element which is made member of the PIN. On receiving the notification, the PIN element do not have to explicitly join the PIN by sending the PIN join request. At step 5*a*-step 5*c*, the individual PIN elements sends the PIN joined notification response to acknowledge the receipt of the notification.

Figure 3:
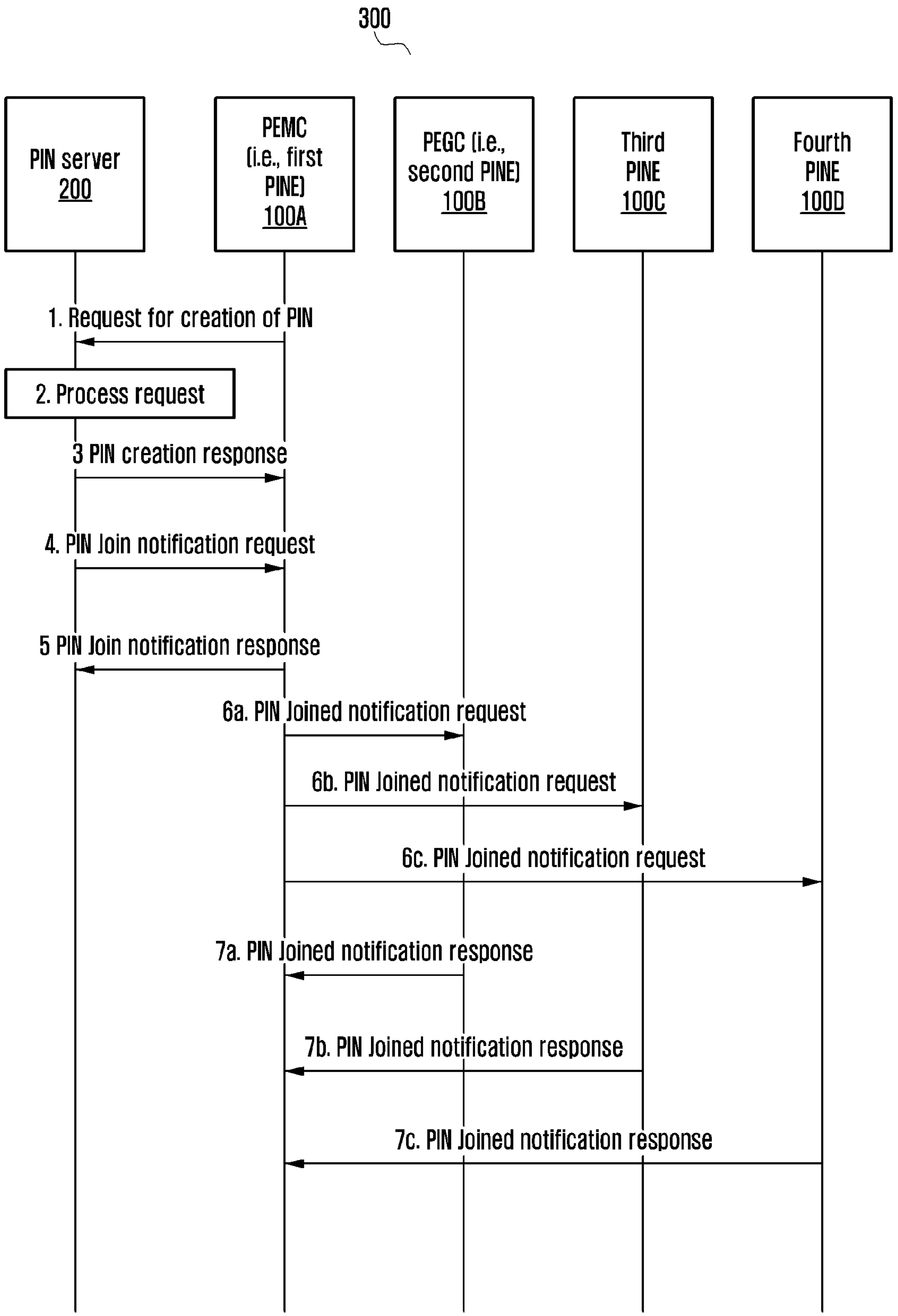
FIG. 3 illustrates a flow diagram of a PIN join indication procedure for PIN join notification and support implicit joining, according to the embodiments as disclosed herein.

FIG. 3 illustrates a flow diagram of a PIN join indication procedure for PIN join notification and support implicit joining, according to the embodiments as disclosed herein. The pre-conditions for the PIN join indication is as follows: The PINE-1 is authorized as the PEMC (100A) and the PINE-2 is authorized as PEGC (100B). The PINE-2, the PINE-3 and the PINE-4 has the application layer connection with the PEMC (PINE-1) (100A). The steps for the PIN join indication is as follows:

Existing steps in the PIN creation procedure as described in 3GPP TR 23.700-78. At step 1, the PEMC (100A) sends the request for creation of PIN to the PIN server (200). The PIN creation request carries the PIN element identifier of other PIN elements which needs to be joined as the member of the PIN being created and the PIN client profile identifiers of each PIN elements. At step 2, the PIN server (200) processes the request for creation of PIN. At step 3, the PIN server (200) sends the PIN creation response to the PEMC (100A).

At step 4, the PIN server (200) sends a PIN join notification request to the PINE-1 (PEMC) (100A). The notification request PIN ID of the newly created PIN and also includes the list of PIN elements and their identifier which are authorized by the PIN server (200) and are added as part of the newly created PIN. At step 5, the PNE-1 (PEMC) (100A) sends the PIN join notification response to the PIN server (200) to acknowledge the receipt of PIN join notification request. At step 6*a*-step 6*c,* based on the list of PIN elements received in the PIN join notification request from the PIN server (200), the PINE-1 (PEMC) (100A) generates the PIN joined notification request and sends it to the PIN elements which are authorized and made member of the PIN. The notification request contains the PIN ID of the PIN created and the PIN identifier of the PIN element which is made member of the PIN. On receiving the notification, the PIN element do not have to explicitly join the PIN by sending the PIN join request. At step 7*a*-step 7*c*, The individual PIN elements sends the PIN joined notification response to acknowledge the receipt of the notification.

Figure 4:
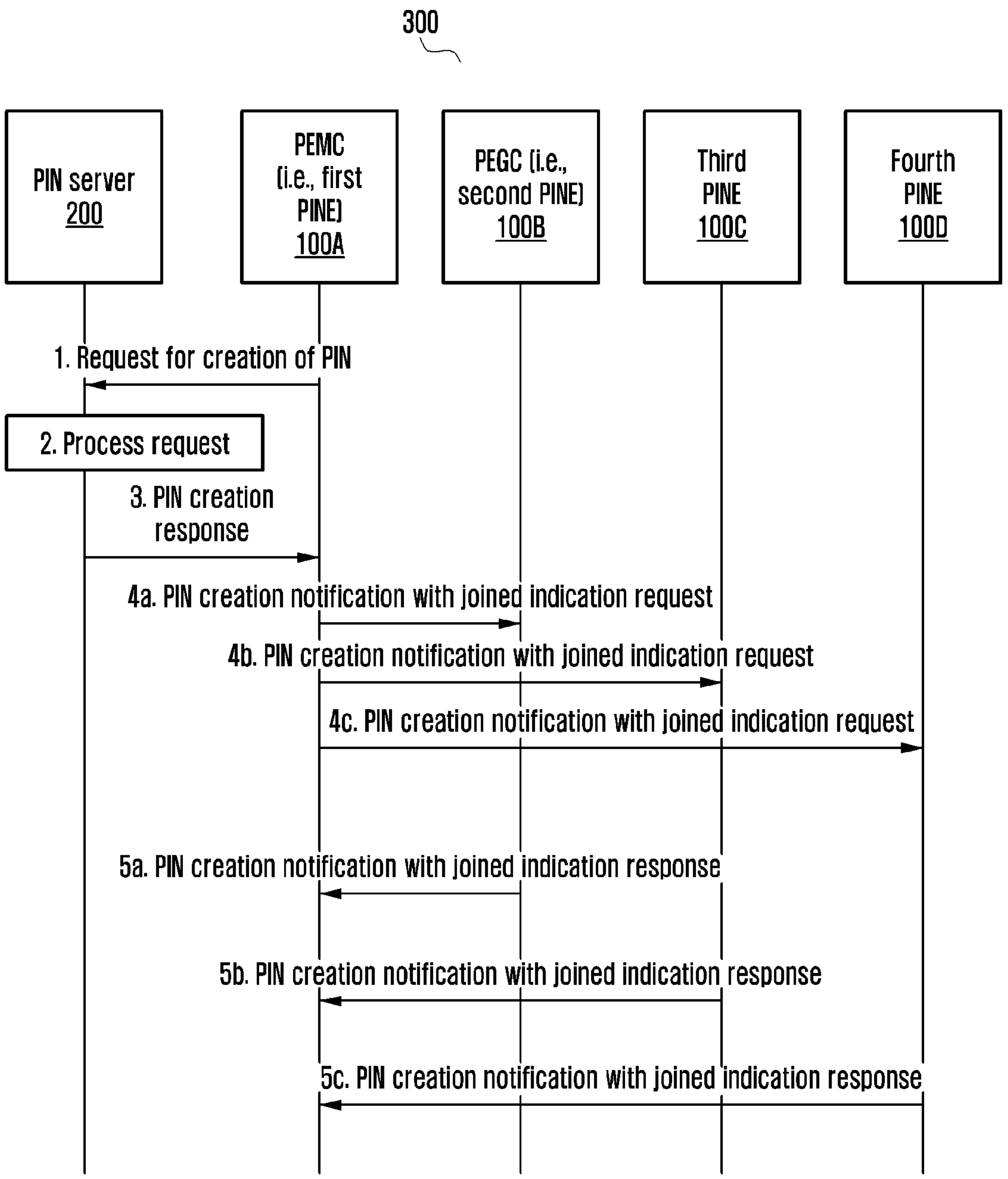
FIG. 4 illustrates a flow diagram illustrating sending notification containing a list of PIN elements for PIN join notification and support implicit joining, according to the embodiments as disclosed herein.

FIG. 4 illustrates a flow diagram illustrating sending notification containing list of PIN elements for PIN join notification and support implicit joining, according to the embodiments as disclosed herein. The pre-conditions for the PIN join indication is as follows: The PINE-1 is authorized as the PEMC (100A) and the PINE-2 is authorized as PEGC (100B). The PINE-3 and the PINE-2, the PINE-3 and the PINE-4 has the application layer connection with the PEMC (PINE-1) (100A). The steps for the PIN join indication is as follows:

Existing steps in the PIN creation procedure as described in 3GPP TR 23.700-78. At step 1, the PEMC (100A) sends the request for creation of PIN to the PIN server (200). The PIN creation request carries the PIN element identifier of other PIN elements which needs to be joined as the member of the PIN being created and the PIN client profile identifiers of each PIN elements. At step 2, the PIN server (200) processes the request for creation of PIN. At step 3, the PIN server (200) sends the PIN creation response to the PEMC (100A). In an embodiment, the PIN server (200) sends a successful response to the PINE-1 (PEMC) (100A), which includes a newly assigned PIN ID to indicate the PIN. The response also includes the list of PIN elements and their identifier which are authorized by the PIN server (200) and are part of the newly created PIN. At step 4*a*-step 4*c*, the PINE-1 (PEMC) (100A) generates the PIN creation notification with joined indication request to individual PIN elements based on the list received in step 3. The notification request PIN ID of the newly created PIN and also indicates that the PIN element is made the member of the newly created PIN. At step 5*a*-step 5*c,* the individual PIN elements sends the PIN creation notification with joined indication response to acknowledge the receipt of the notification. The PIN elements receiving the PIN creation notification with joined indication request shall not join the PIN by issuing the PIN join request since they are already made as the member of the PIN.

Figure 5:
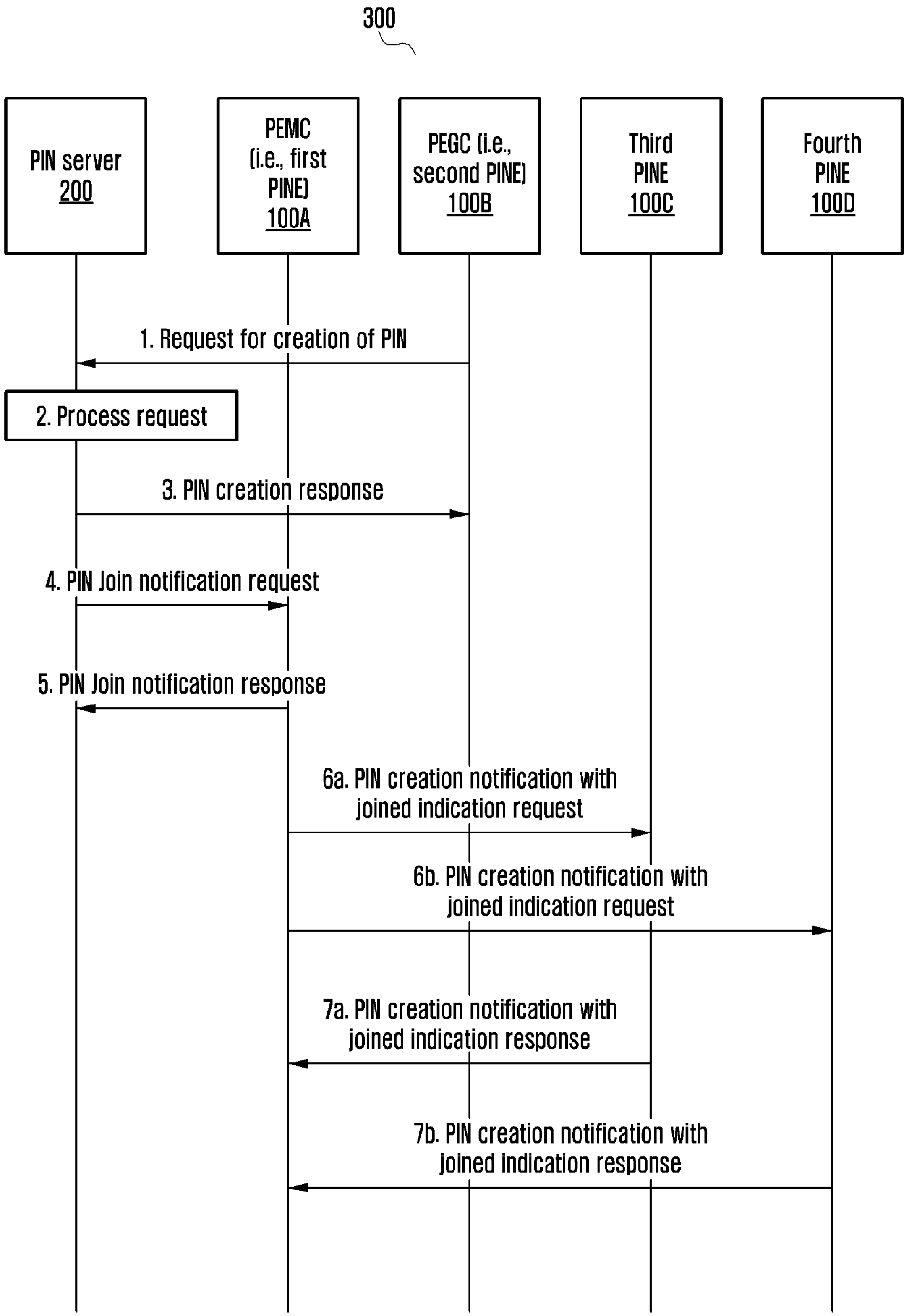
FIG. 5 illustrates a flow diagram of a PEMC generating of the PIN elements for PIN join notification and support implicit joining, according to the embodiments as disclosed herein.

FIG. 5 illustrates a flow diagram of PEMC generating of PIN elements for PIN join notification and support implicit joining, according to the embodiments as disclosed herein. The pre-conditions for the PIN join indication is as follows: The PINE-1 is authorized as the PEMC (100A) and the PINE-2 is authorized as PEGC (100B). The PINE-3 and the PINE-4 has the application layer connection with the PEMC (PINE-1) (100A) and PEGC (100B). The steps for the PIN join indication is as follows:

Existing steps in the PIN creation procedure as described in 3GPP TR 23.700-78. At step 1, the PEGC (100A) sends the request for creation of PIN to the PIN server (200). The PIN creation request carries the PIN element identifier of other PIN elements which needs to be joined as the member of the PIN being created and the PIN client profile identifiers of each PIN elements. At step 2, the PIN server (200) processes the request for creation of PIN. At step 3, the PIN server (200) sends the PIN creation response to the PEGC (100A).

At step 4, the PIN server (200) sends the PIN join notification request to the PEMC (100A), which includes a newly assigned PIN ID to indicate the PIN. The response also includes the list of PIN elements and their identifier which are authorized by the PIN server (200) and are part of the newly created PIN. The request also indicates that PINE-2 also authorized to be PEGC (100B) of the PIN. At step 6*a*-step 6*b,* the PINE-1 (100A) sends the PIN join notification response to the PIN server (200) to acknowledge the receipt of the PIN join notification request. The PINE-1 (PEGC (100B)) generates the PIN creation notification with joined indication request or it can generate PIN joined notification request to individual PIN elements based on the list received in step 4. The notification request contains PIN ID of the newly created PIN and also indicates that the PIN element is made the member of the newly created PIN. At step 7*a* and step 7*b,* the individual PIN elements sends the PIN creation notification with joined indication response to acknowledge the receipt of the notification. The PIN elements receiving the PIN creation notification with joined indication request shall not join the PIN by issuing the PIN join request since they are already made as the member of the PIN.

In an embodiment, the PIN joined notification request sent from the PEMC (100A)/PEGC (100B) to the individual PIN elements. The PIN joined notification request includes the PIN ID to identify the newly created PIN, PIN element identifier and also certain basic PIN profile information such as PIN server (200), the PEMC (100A) and the PEGC (100B) reachability information (e.g., IP address/FQDN), services offered by the PIN etc.

In another embodiment, the PIN join notification request sent from the PIN server (200) to the PEMC (100A) or the PEGC (100B). The PIN join notification request includes the PIN ID of the newly created PIN, the list of PIN elements and their identifiers (PIN element/PIN client ID) which are made as members of the PIN and also certain basic PIN profile information such as PIN server (200), the PEMC and the PEGC reachability information (IP address/FQDN), services offered by the PIN etc.

In another embodiment, the PIN creation notification with joined indication request sent from the PEMC (100A)/PEGC (100B) to the individual PIN elements. The PIN creation notification contains the PIN ID to identify the newly created PIN, PIN element identifier and also certain basic PIN profile information such as PIN server (200), PEMC and PEGC (100B) reachability information (IP address/FQDN), services offered by the PIN etc.

In an embodiment, the details of the information related to the PIN are maintained at each of the PIN entities like the PIN server (200), the PEMC (100A), the PEGC (100B) and PIN elements. The proposed method can be used to extend the PIN profile information to contain the details of whether the PIN element can be assigned with the role of primary (i.e., PEMC-P) or secondary (i.e., PEMC-S) (100*e*). There could be more than one PIN element with the primary role and in the case the PIN server (200) can assign the role based on which PIN element is registering first and other PIN elements if they are registering after can be assigned with the PEMC-S role (100*e*). With the mechanism the PIN admin or PIN owner can configure the PIN information to specify which PIN elements can be assigned with the role of PEMC-P (100F) or PEMC-S (100E).

The PIN dynamic profile information can be extended to carry the details of whether the PINE is assigned with the role of the PEMC-P (100F) or the PEMC-S (100E) against each PIN element authorized as the PEMC. The changes to the PIN profile and PIN dynamic profile information is shown in Table 1 and Table 2.

TABLE 1

| Parameter Name | Parameter Description | PIN Server | PEMC | PEGC | PINE |
|---|---|---|---|---|---|
| PIN ID | The identifier of the PIN | Y (Yes) | Y | Y | Y |
| PIN Description | Human-readable description of the PIN, for example, the company name, location or the type of service. | Y | Y | Y | Y |
| Duration | Specifies the time period of how long the PIN can be active | Y | Y | Y | Y |
| Maximum number of PIN elements | Maximum number of PIN elements allowed to join the PIN | Y | Y | N | No (N) |
| PIN service | List of service that a PIN can provide, including the PINE service or the service that can provided by application client on PINE: >PIN service Provider Identifier >PIN service type >PIN service Feature | Y | Y | N | Y |
| PEMC list | The list of identifiers of the PIN elements which can be allowed to take the role as PEMC (e.g.: PIN client ID, UE GPSI etc.,) and also it contains whether the role is primary or secondary | Y | Y | Y | Y |
| PEGC ID list | The list of identifiers of the PIN elements which can be allowed to take the role as PEGC (e.g.: PIN client ID, UE GPSI etc.,) | Y | Y | Y | Y |
| PIN Server ID | The identifier of the PIN server that serves the PIN | N | Y | Y | Y |
| PIN server Endpoint | Endpoint information (e.g. URI, FQDN, IP address) used to communicate with the PIN server. | N | Y | Y | Y |
| PIN Elements List | List of PIN elements which can be allowed to join the PIN >PIN element ID | Y | Y | Y | N |

TABLE 2

| Parameter Name | Parameter Description | PIN Server | PEMC | PEGC |
|---|---|---|---|---|
| PIN ID | The identifier of the PIN | Y | Y | Y |
| PIN Description | Human-readable description of the PIN, for example, the company name, location or the type of service. | Y | Y | Y |
| Services offered | List of services offered by the PIN | Y | Y | N |
| Duration | Time period specifying how long the PIN can be active | | | |
| PEMC list | The list of identifiers of the PIN elements which are currently serving as PEMC (e.g.: PIN client ID, UE GPSI etc.,) | Y | Y | Y |
| PEMC Endpoint | Endpoint information of each PEMC (e.g. URI, FQDN, IP address) used to communicate with the PEMC and whether the PEMC is authorized as PEMC-P or PEMC-S | Y | Y | Y |
| Duration | Time period of being PEMC | Y | Y | Y |
| PEGC list | The list of identifiers of the PIN elements which are currently serving as PEGC (e.g.: PIN client ID, UE GPSI etc.,) | Y | Y | Y |
| PEGC Endpoint | Endpoint information of each PEGC (e.g. URI, FQDN, IP address) used to communicate with the PEGC. | Y | Y | Y |
| Duration | Time period of being PEGC | Y | Y | Y |
| PEGC Supported KPIs | KPIs supported by the PEGC (e.g., maximum number of assigned PIN elements) | Y | Y | Y |
| PEGC Schedule | Scheduled times when the PEGC is available to service PIN elements (e.g., time window). | Y | Y | Y |
| PIN Elements details | List of PIN elements being served by PEGC and their connectivity information | Y | Y | Y |
| PIN Server ID | The identifier of the PIN server that serves the PIN | N | Y | Y |
| PIN server Endpoint | Endpoint information (e.g. URI, FQDN, IP address) used to communicate with the PIN server. | N | Y | Y |
| PIN Elements List | List of PIN elements currently registered/joined the PIN | Y | Y | N |
| PIN Element ID | Identify of the PIN element | Y | Y | Y |
| Services offered | Services offered by the PIN element | Y | Y | Y |
| Reachability information | Reachability information of the PIN element | Y | Y | Y |
| Application List | List of application clients for the PIN element including: Minimum KPIs required by each application client to operate effectively within the PIN (e.g., PIN bandwidth, PIN request rate, PIN response time) Operational schedules of each application client (e.g., time windows) | Y | Y | Y |
| Default PEGC | Identifier of the default PEGC authorized to service the PIN element. The PIN element will use the PEGC as the primary PEGC to relay PIN communications. Location and/or schedule information for the default PEGC may also be included such that the default PEGC may be selected by the PIN element based on its current location and proximity to the default PEGC and/or the availability schedule of the default PEGC. | Y | Y | Y |

TABLE 2-continued

| Parameter Name | Parameter Description | PIN Server | PEMC | PEGC |
|---|---|---|---|---|
| Backup PEGCs List | Identifiers of backup PEGCs authorized to service the PIN element. The list is in prioritized order (the first PEGC listed will serve as the first backup PEGC). If the default PEGC is not available, the PIN element will use the prioritized list of PEGCs to relay PIN communications. Location and/or schedule information for each of the backup PEGCs may also be included such that a backup PEGC may be selected by the PIN element based on its current location and proximity to a backup PEGC and/or the availability schedule of the PEGC. | Y | Y | Y |

For each PIN only one PIN element is assigned with the role of PEMC-P (100*f*), this PEMC can perform all the PIN management operation and is authorized to establish a Protocol Data Unit (PDU) connection and interface with the PIN server (200). For ease of management of the PIN by the authorized users or the PIN owner or PIN admin, there may be one or more PEMC-Ss (100*e*) and these PEMCs are allowed to perform the certain PIN operations based on the action/request from the PIN owner or PIN admin/authorized user. The PEMC-S (100*e*) shall route the PIN management operation related requests to the PEMC-P (100*f*) and it shall not directly interface with PIN server (200) for any PIN management related operations.

Following are the PIN management operations which PEMC-S (100*e*) can handle with the help of PEMC-P (100*f*). Below list is just examples and in general any PIN requests/PIN management operation that requires to be authorized by the PEMC-P (100*f*) or the PIN server (200) is sent to the PEMC-P (100*f*) by the PEMC-S (100*e*). In general through the PEMC-S (100*e*), the PIN admin or PIN admin should be able to do the operations which he would be able to do with PEMC-P (100*f*) for providing a seamless user experience. But internally the PEMC-S (100*e*) shall generate the request to the PEMC-P (100*f*) to fulfil the operation requested by the PIN admin or PIN owner.

1. Adding PIN element into the PIN,
2. Removing the PIN element from the PIN,
3. Deletion of PIN,
4. Suspend and Resume the PIN, and
5. PIN profile query Some operations like handling of PIN discovery and PIN service discovery can be handled by the PEMC-S (100*e*) without having to be authorized by the PEMC-P (100*f*). The PIN admin/PIN owner can configure the PIN in order to carry the details of what operations can be allowed to be performed by the PEMC-S (100*e*). These details can be captured in a separate profile for the PEMC-Ss (100*e*).

Since the PEMCs are assigned with secondary role cannot authorize the PIN management operations or PIN requests by itself it should send those requests to the PEMC-P (100*f*) for authorizing. The requests are sent to the PEMC-P (100*f*) depends on whether the PEMC-S (100*e*) has direct connection with PEMC-P (100*f*) or not. If it has direct connection, the PEMC-S (100*e*) can send the request to the PEMC-P (100*f*) directly. If no direct connection available since they are placed far away, the PEMC-S (100*e*) can reach the PEMC-P (100*f*) via PEGC (100B). In this case, it is assumed that PEMC-S (100*e*) has direct connection with PEGC (100B) and PEGC (100B) is able to reach the PEMC-P (100*f*). So below 2 types of routing are supported: are via PIN direct connection and via PEGC (100B). It is the PEMC-P (100*f*) that interfaces with the PIN server (200) and PEMC-Ss (100*e*) cannot directly talk to PIN server (200) for any authorization of PIN management operations.

Figure 6:
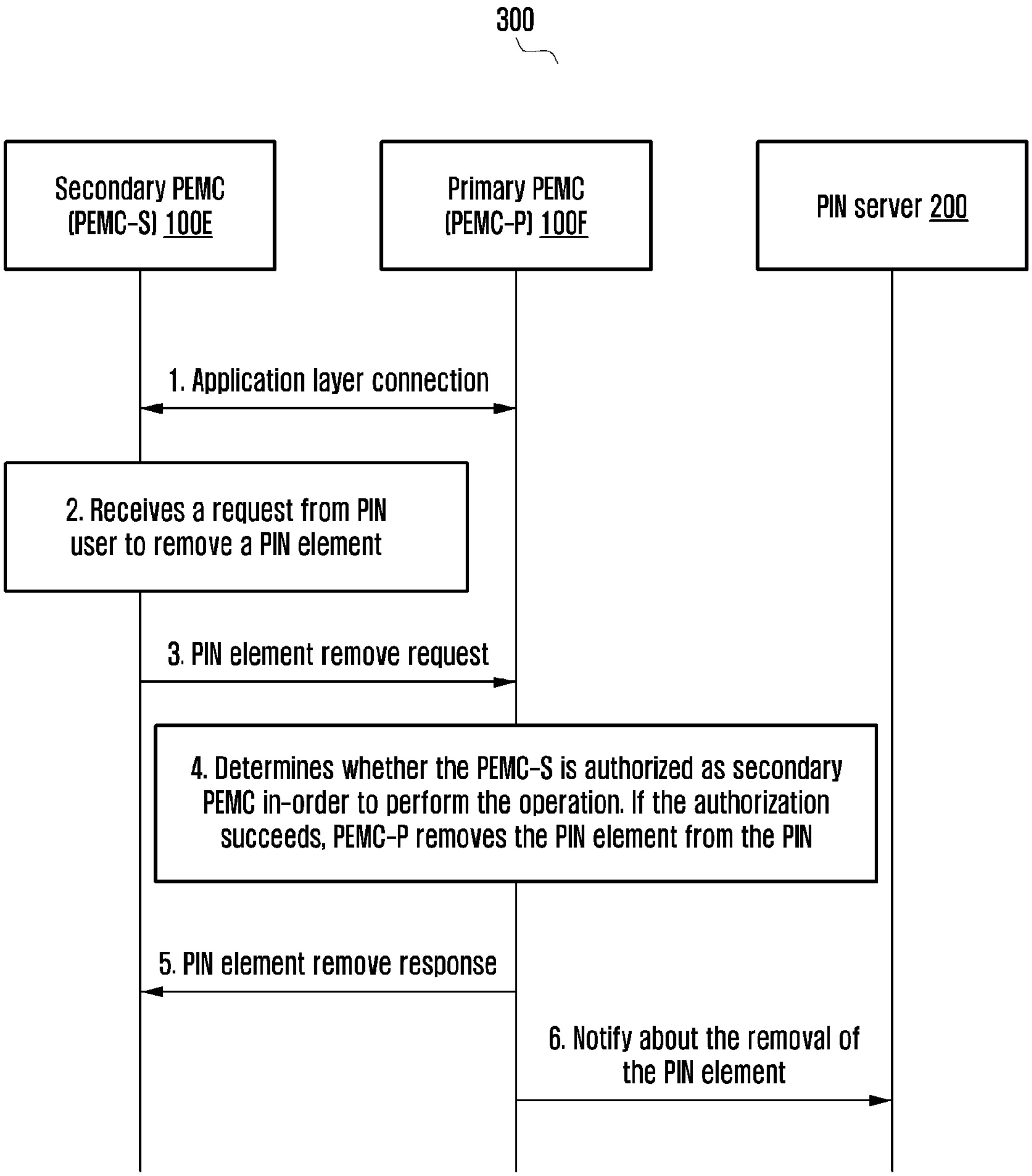
FIG. 6 illustrates a sequence diagram of a PIN element removal procedure by a PEMC-S, according to embodiments herein.

FIG. 6 illustrates a sequence diagram of PIN element removal by PEMC-S (100*e*), according to embodiments herein. The pre-conditions for the PIN element removal by the PEMC-S (100*e*) is:

1. The PEMC-S (100E) is assigned with the role of the PEMC-S (100*e*),
2. PEMC-P (100F) is assigned with the role of PEMC-P (100F),
3. PEMC-S (100E) has the PIN profile and PIN dynamic profile information, and
4. PEMC-S (100E) has direct connection or PIN direct connection with the PEMC-P (100F).

At step 1, the PEMC-S (100E) may already have an application layer connection established with the PEMC-P (100F) or it could be established on the receiving request from the PIN admin/PIN owner for performing the PIN management operation. At step 2, the PEMC-S (100E) receives a request from the PIN user to remove the PIN element from the PIN. At step 3, the PEMC-S (100E) sends the PIN element remove request to the PEMC-P (100F). The request shall carry the PIN client ID of the PIN element to be removed, PIN ID, PIN client ID of the PEMC-S (100E). At step 4, The PEMC-P (100F) on receiving the request checks whether the PEMC-S (100E) is authorized as PEMC-S (100*e*) in-order to perform the operation. If the authorization succeeds, the PEMC-P (100F) removes the PIN element from the PIN. At step 5, the PEMC-P (100F) sends the PIN element remove response to the PEMC-S (100E) containing the status/result of the PIN element remove operation. At step 6, the PEMC-P (100F) follows the existing procedure as specified in TR 23.700-78 to notify the PIN entities like PIN server (200), PEGC (100B), other PEMCs if any.

Figure 7:
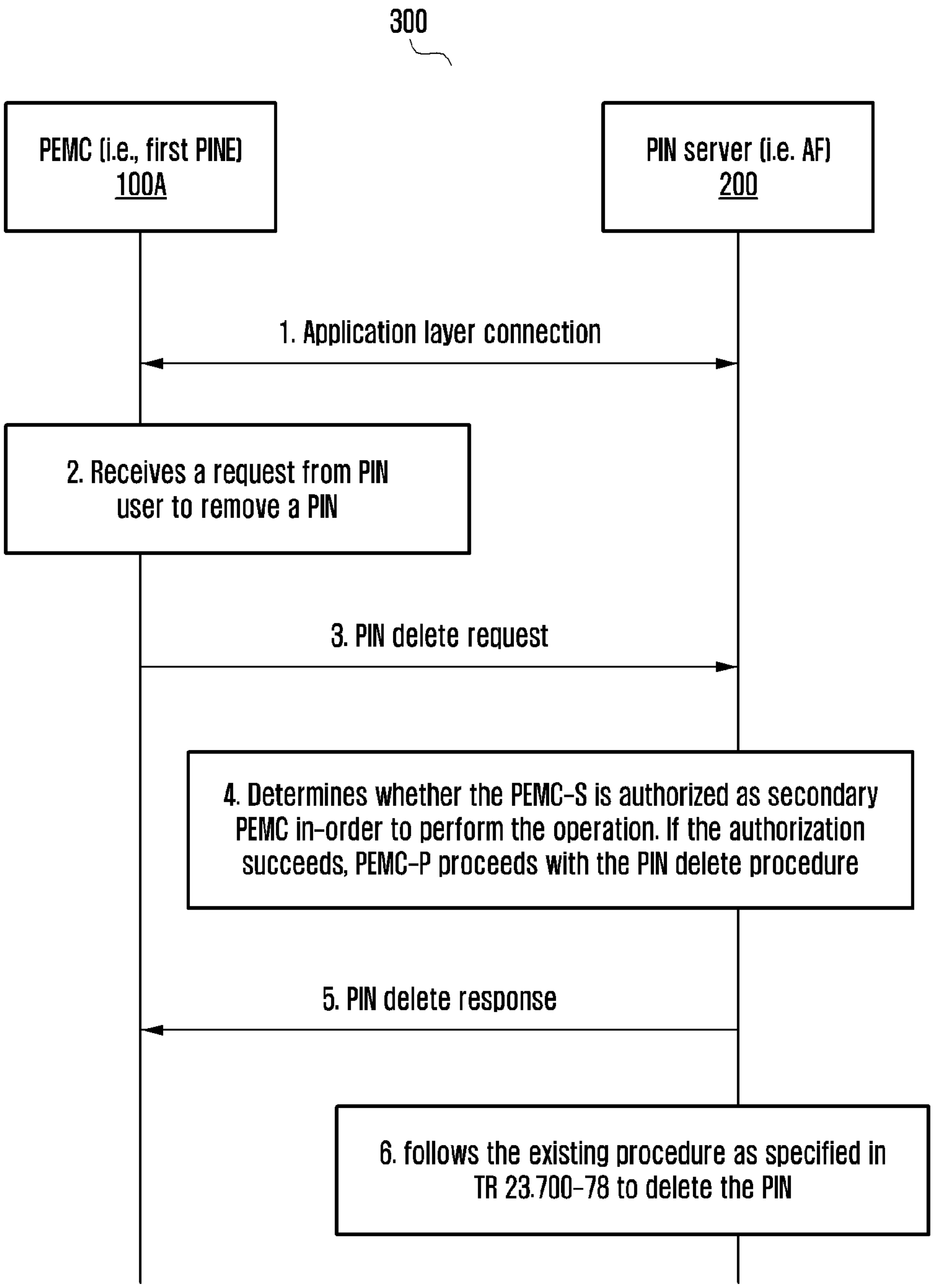
FIG. 7 illustrates a sequence diagram of a PIN deletion procedure by the PEMC-S, according to embodiments herein.

FIG. 7 illustrates a sequence of PIN deletion by PEMC-S (100*e*), according to embodiments herein. The preconditions for the PIN deletion by PEMC-S (100*e*) is follows:

1. The PEMC-S (100E) is assigned with the role of PEMC-S (100E),
2. The PEMC-P (100F) is assigned with the role of the PEMC-P (100*f*),
3. The PEMC-S (100E) and the PEMC-P (100F) has the PIN profile and PIN dynamic profile information, and 4. The PEMC-S (100E) has direct connection or PIN direct connection with the PEMC-P (100F).

At step 1, the PEMC-S (100E) may already have an application layer connection established with PEMC-P (100F) or it could be established on receiving request from PIN admin/PIN owner for performing PIN management operation. At step 2, the PEMC-S (100E) receives the request from the PIN user to delete the PIN. At step 3, the PEMC-S (100E) sends the PIN delete request to the PEMC-P (100F). The request shall carry the PIN ID of the PIN to be deleted, PIN client ID of the PEMC-S (100E), other authorization details if any, reason for deletion of the PIN. At step 4, the PEMC-P (100F), on receiving the request, checks whether the PEMC-S (100E) is authorized as PEMC-S (100*e*) in-order to perform the operation. If the authorization succeeds, the PEMC-P (100F) proceeds with the PIN delete procedure. At step 5, the PEMC-P (100F) sends the PIN delete response to the PEMC-S (100E) containing the status/result of the PIN delete operation. At step 6, The PEMC-P (100F) follows the existing procedure as specified in TR 23.700-78 to delete the PIN.

Figure 8:
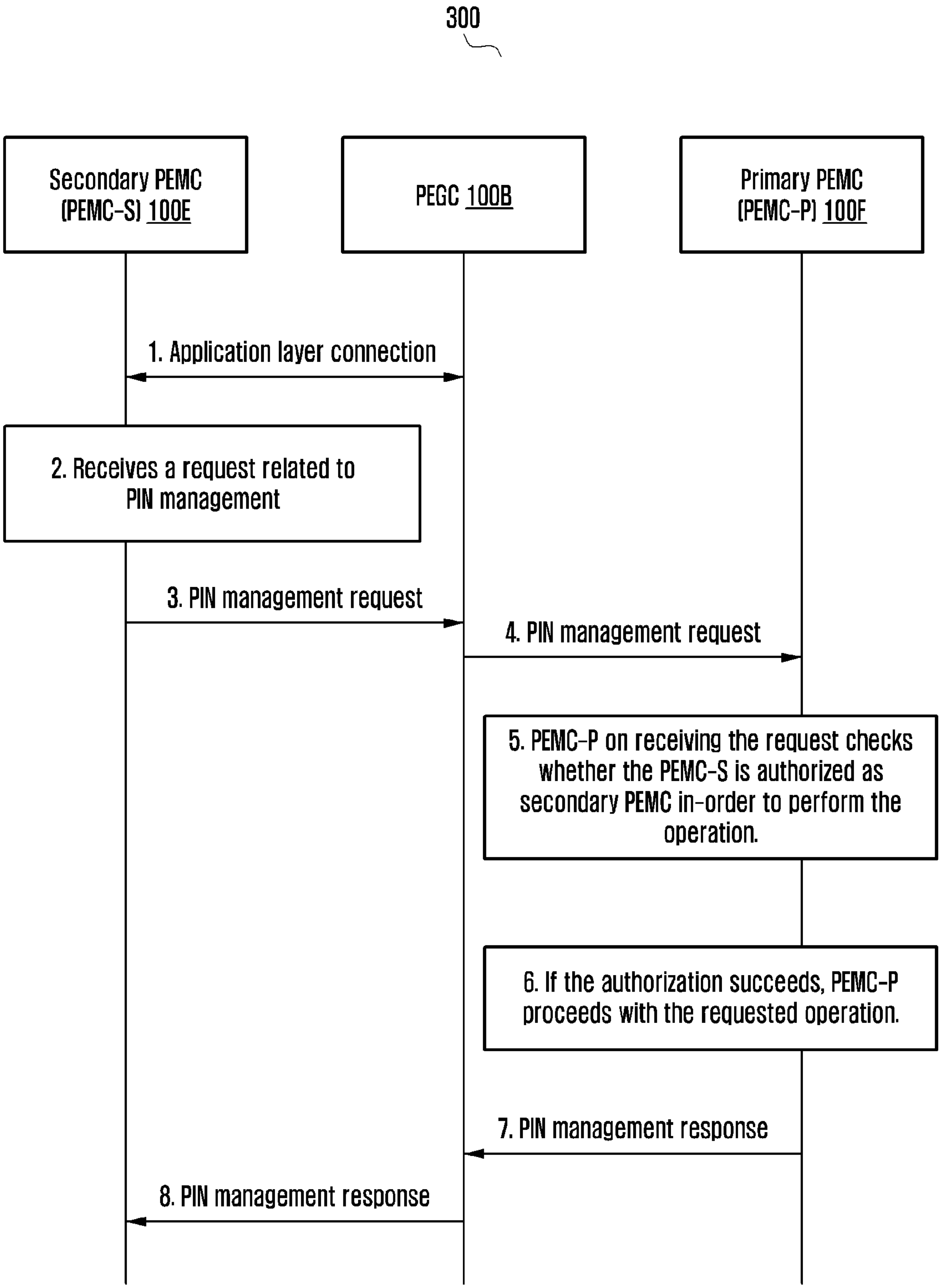
FIG. 8 illustrates a sequence diagram of routing of PIN management operation using a PEGC, according to embodiments herein.

FIG. 8 illustrates a sequence of routing of PIN management operation using PEGC (100B), according to embodiments herein. The preconditions for routing of PIN management operation by PEGC (100B) are:

1. The PEMC-S (100E) is assigned with the role of PEMC-S (100*e*),
2. The PEMC-P (100F) is assigned with the role of PEMC-P (100*f*),
3. The PEMC-S (100E), PEMC-P (100F) has the PIN profile and PIN dynamic profile information, and
4. The PEMC-S (100E) has no direct connection or PIN direct connection with the PEMC-P (100F).

At step 1, the PEMC-S (100E) may already have an application layer connection established with PEGC (100B) or it could be established on receiving request from PIN admin/PIN owner for performing PIN management operation. At step 2, the PEMC-S (100E) receives a request from PIN user to perform any of the PIN management operations. These operations could be PIN element removal, PIN element addition, PIN deletion, PIN configuration update etc. At step 3, the PEMC-S (100E) prepares the corresponding request including the required details for the requested operation and sends it to PEGC (100B). These requests shall carry the PIN client ID of the PEMC-S (100E) mandatorily. At step 4, the PEGC (100B) on receiving these requests, it just forwards it to the PEMC-P (100*f*) (PEMC-P (100F)). At step 5, the PEMC-P (100F) on receiving the request checks whether the PEMC-S (100E) is authorized as PEMC-S (100*e*) in-order to perform the operation. At step 6, if the authorization succeeds, PEMC-P (100F) proceeds with the requested operation. At step 7, The PEMC-P (100F) sends the response to the PEGC (100B) containing the status/result of the requested operation. At step 8, the PEGC (100B) forwards it to the PEMC-S (100E).

For the sake of brevity, the requests are shown as PIN management request and these PIN management request could be like PIN element removal, PIN deletion, PIN configuration update etc.

The PEMC-Ss (100*e*) shall be able to view the PIN information when requested or they can be shared with the PIN profile information and PIN dynamic information so that the PIN owner or PIN admin would be able to view the PIN information through PEMC-S (100*e*) also. The PIN server (200) or PEGC (100B) or the PEMC-P (100F) can notify the required events to the PEMC-S (100*e*) so that the PEMC-S (100*e*) can update the PIN profile information and PIN dynamic profile information accordingly and is up to date with the PIN information.

Figure 9:
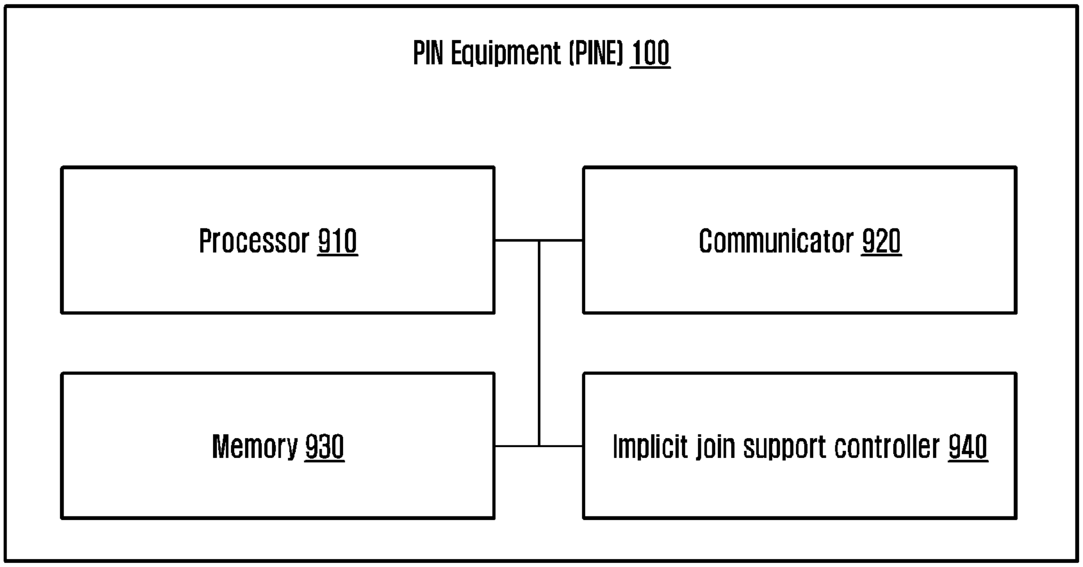
FIG. 9 illustrates various hardware components of a PIN-E, according to the embodiments as disclosed herein.

FIG. 9 illustrates various hardware components of the PIN-E (100), according to the embodiments as disclosed herein. Consider, the first PINE is the PEMC (100A) and the second PINE is the PEGC (100B) or the normal PINE (100C or 100D). In an embodiment, the PIN-E (100) includes a processor (910), a communicator (920), a memory (930) and an implicit join support controller (940). The processor (910) is coupled with the communicator (920), the memory (930) and the implicit join support controller (940).

The implicit join support controller (940) sends the PIN creation request message to the PIN apparatus (1000) to create the PIN (300). The PIN creation request message includes the security credentials of the second PEMC received during authorization procedure, the list of PIN elements to be included in the PIN, and the PINE identifier having the GPSI, the PIN client ID, the PINE location, and the PIN client profile information. After creation of the PIN based on the PIN creation request message, the implicit join support controller (940) receives the PIN creation response message from the PIN apparatus (1000). The PIN creation response message includes the PIN ID of the created PIN, the list of PIN elements and corresponding identifier authorized and made as member of the created PIN when the PIN creation request message comprises a list of PIN elements to be included in the PIN. Further, the implicit join support controller (940) creates the PIN creation notification request message. The PIN creation notification request message includes the PIN ID of the created PIN, and the indication indicating that the second PINE is made a member of the created PIN. Further, the implicit join support controller (940) sends the PIN creation notification request message to the second PINE.

Further, the implicit join support controller (940) receives the PIN creation notification response message from the second PINE. In an embodiment, the second PINE receiving the PIN creation notification request message with joined indication does not join the created PIN by issuing a PIN join request as the second PINE is already made a member of the created PIN.

The implicit join support controller (940) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (910) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (910) may include multiple cores and is configured to execute the instructions stored in the memory (930).

Further, the processor (910) is configured to execute instructions stored in the memory (930) and to perform various processes. The communicator (920) is configured for communicating internally between internal hardware components and with external devices via one or more networks. The memory (930) also stores instructions to be executed by the processor (910). The memory (930) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (930) may, in some examples, be considered a non-transitory storage medium. The term "non-transitory" may indicate that the storage medium is not embodied in a carrier wave or a propagated signal. However, the term "non-transitory" should not be interpreted that the memory (930) is non-movable. In certain examples, a non-transitory storage medium may store data that can, over time, change (e.g., in Random Access Memory (RAM) or cache).

Although the FIG. 9 shows various hardware components of the PIN-E but it is to be understood that other embodiments are not limited thereon. In other embodiments, the PIN-E may include less or more number of components. Further, the labels or names of the components are used only for illustrative purpose and does not limit the scope of the present disclosure. One or more components can be combined together to perform same or substantially similar function in the PIN-E.

Figure 10:
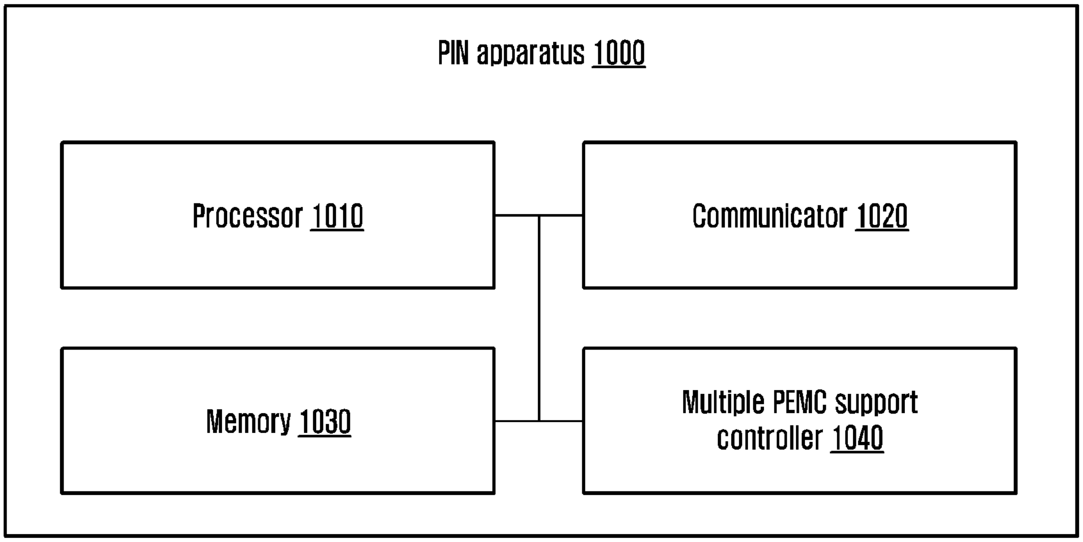
FIG. 10 illustrates various hardware components of a PIN apparatus, according to the embodiments as disclosed herein.

FIG. 10 illustrates various hardware components of the PIN apparatus (1000), according to the embodiments as disclosed herein. The PIN apparatus can be the PIN server (200), the PINE (100C or 100D), and the PEMC (100A). In an embodiment, the PIN apparatus (1000) includes a processor (1010), a communicator (1020), a memory (1030) and a multiple PEMC support controller (1040). The processor (1010) is coupled with the communicator (1020), the memory (1030) and the multiple PEMC support controller (1040).

The multiple PEMC support controller (1040) determines whether the first PINE is authorized to act as PEMC and take a role of the PEMC-P (100F) or the PEMC-S (100E) based on the stored PIN profile. Further, the multiple PEMC support controller (1040) determines whether the PIN is created. Further, the multiple PEMC support controller (1040) assigns the first PINE the role of the PEMC-P (100F) when the PIN is not created and the first PINE is authorized to act as the PEMC and take the role of the PEMC-P (100F). Further, the multiple PEMC support controller (1040) assigns the first PINE the role of the PEMC-S (100E) when the PIN is created irrespective of the first PINE is authorized to act as the PEMC and take the role of the PEMC-P (100F). Further, the multiple PEMC support controller (1040) creates a dynamic PIN profile based on the stored PIN profile and the assigned role as the PEMC-P (100F) to the first PINE. Further, the multiple PEMC support controller (1040) stores the dynamic PIN profile in the memory (1030) of the PIN apparatus (1000).

In an embodiment, further, the multiple PEMC support controller (1040) creates the dynamic PIN profile based on the stored PIN profile and the assigned role as the PEMC-P (100F) to the first PINE. Further, the multiple PEMC support controller (1040) storing the dynamic PIN profile.

In an embodiment, further, the multiple PEMC support controller (1040) receives the PINE registration request message from the second PINE. The PINE registration request message includes security credentials of the first PINE received during authorization procedure of the of the first PINE, a GPSI of the first PINE, a MAC address of the first PINE, vendor name of the first PINE, device description of the first PINE, and an address of the first PINE, the security credentials of the second PINE received during authorization procedure of the of the second PINE, the GPSI of the second PINE, the MAC address of the second PINE, vendor name of the second PINE, device description of the second PINE, and an address of the second PINE.

The multiple PEMC support controller (1040) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (1010) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (1010) may include multiple cores and is configured to execute the instructions stored in the memory (1030).

Further, the processor (1010) is configured to execute instructions stored in the memory (1030) and to perform various processes. The communicator (1020) is configured for communicating internally between internal hardware components and with external devices via one or more networks. The memory (1030) stores the PIN profile. The PIN profile includes the list of identifiers of the one or more PINEs which that are authorized to act as PEMC and take a role of the PEMC-P (100F) or the PEMC-S (100E). The memory (1030) also stores instructions to be executed by the processor (1010). The memory (1030) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1030) may, in some examples, be considered a non-transitory storage medium. The term "non-transitory" may indicate that the storage medium is not embodied in a carrier wave or a propagated signal. However, the term "non-transitory" should not be interpreted that the memory (1030) is non-movable. In certain examples, a non-transitory storage medium may store data that can, over time, change (e.g., in Random Access Memory (RAM) or cache).

Although the FIG. 10 shows various hardware components of the PIN apparatus (1000) but it is to be understood that other embodiments are not limited thereon. In other embodiments, the PIN apparatus (1000) may include less or more number of components. Further, the labels or names of the components are used only for illustrative purpose and does not limit the scope of the present disclosure. One or more components can be combined together to perform same or substantially similar function in the PIN apparatus (1000).

Figure 11:
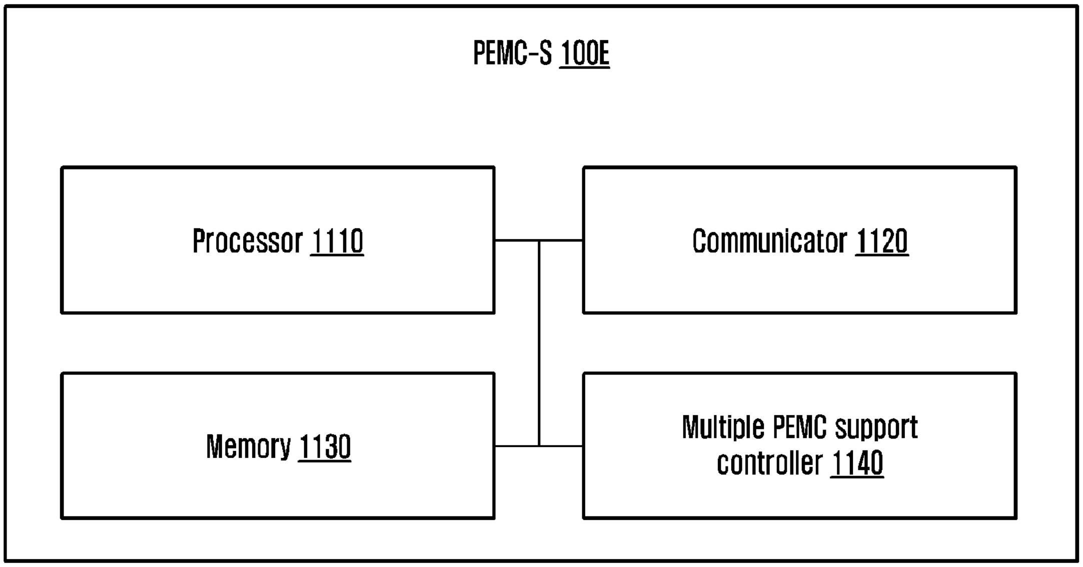
FIG. 11 illustrates various hardware components of the PEMC-S, according to the embodiments as disclosed herein.

FIG. 11 illustrates various hardware components of the PEMC-S (100E), according to the embodiments as disclosed herein. In an embodiment, the PEMC-S (100E) includes a processor (1110), a communicator (1120), a memory (1130) and a multiple PEMC support controller (1140). The processor (1110) is coupled with the communicator (1120), the memory (1130) and the multiple PEMC support controller (1140).

The multiple PEMC support controller (1140) receives the message from the PIN user or the PIN owner or the PIN admin to perform the PIN management operation. Further, the multiple PEMC support controller (1140) creates the PIN management operation request message including the PIN management operation. Further, the multiple PEMC support controller (1140) sends the PIN management operation request message to the PEMC-P (100F). Further, the multiple PEMC support controller (1140) receives the PIN management operation response message from the PEMC-P (100F).

The multiple PEMC support controller (1140) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (1110) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (1110) may include multiple cores and is configured to execute the instructions stored in the memory (1130).

Further, the processor (1110) is configured to execute instructions stored in the memory (1130) and to perform various processes. The communicator (1120) is configured for communicating internally between internal hardware components and with external devices via one or more networks. The memory (1130) also stores instructions to be executed by the processor (1110). The memory (1130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1130) may, in some examples, be considered a non-transitory storage medium. The term "non-transitory" may indicate that the storage medium is not embodied in a carrier wave or a propagated signal. However, the term "non-transitory" should not be interpreted that the memory (1130) is non-movable. In certain examples, a non-transitory storage medium may store data that can, over time, change (e.g., in Random Access Memory (RAM) or cache).

Although the FIG. 11 shows various hardware components of the PEMC-S (100E) but it is to be understood that other embodiments are not limited thereon. In other embodiments, the PEMC-S (100E) may include less or more number of components. Further, the labels or names of the components are used only for illustrative purpose and does not limit the scope of the present disclosure. One or more components can be combined together to perform same or substantially similar function in the PEMC-S (100E).

Figure 12:
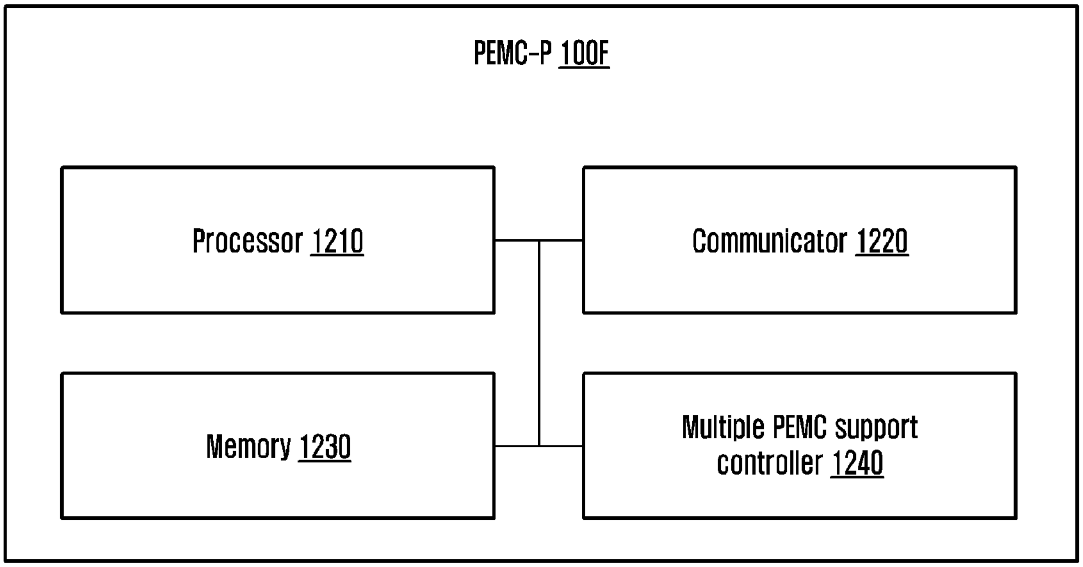
FIG. 12 illustrates various hardware components of a PEMC-P, according to the embodiments as disclosed herein.

FIG. 12 illustrates various hardware components of a PEMC-P (100F), according to the embodiments as disclosed herein. In an embodiment, the PEMC-P (100F) includes a processor (1210), a communicator (1220), a memory (1230) and a multiple PEMC support controller (1240). The processor (1210) is coupled with the communicator (1220), the memory (1230) and the multiple PEMC support controller (1240).

The multiple PEMC support controller (1240) receives the PIN management operation request message from the PEMC-S (100E). Further, the multiple PEMC support controller (1240) determines whether the PEMC-S (100E) is authorized as PEMC-S (100*e*) to perform the operation upon receiving the PIN management operation request message. Further, the multiple PEMC support controller (1240) performs the PIN management operation when the PEMC-S (100E) is authorized as the PEMC-S (100*e*). Further, the multiple PEMC support controller (1240) sends the PIN management operation response message to the PEMC-S (100E).

The multiple PEMC support controller (1240) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (1210) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (1210) may include multiple cores and is configured to execute the instructions stored in the memory (1230).

Further, the processor (1210) is configured to execute instructions stored in the memory (1230) and to perform various processes. The communicator (1220) is configured for communicating internally between internal hardware components and with external devices via one or more networks. The memory (1230) also stores instructions to be executed by the processor (1210). The memory (1230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1230) may, in some examples, be considered a non-transitory storage medium. The term "non-transitory" may indicate that the storage medium is not embodied in a carrier wave or a propagated signal. However, the term "non-transitory" should not be interpreted that the memory (1230) is non-movable. In certain examples, a non-transitory storage medium may store data that can, over time, change (e.g., in Random Access Memory (RAM) or cache).

Although the FIG. 12 shows various hardware components of the PEMC-P (100F) but it is to be understood that other embodiments are not limited thereon. In other embodiments, the PEMC-P (100F) may include less or more number of components. Further, the labels or names of the components are used only for illustrative purpose and does not limit the scope of the present disclosure. One or more components can be combined together to perform same or substantially similar function in the PEMC-P (100F).

Figure 13:
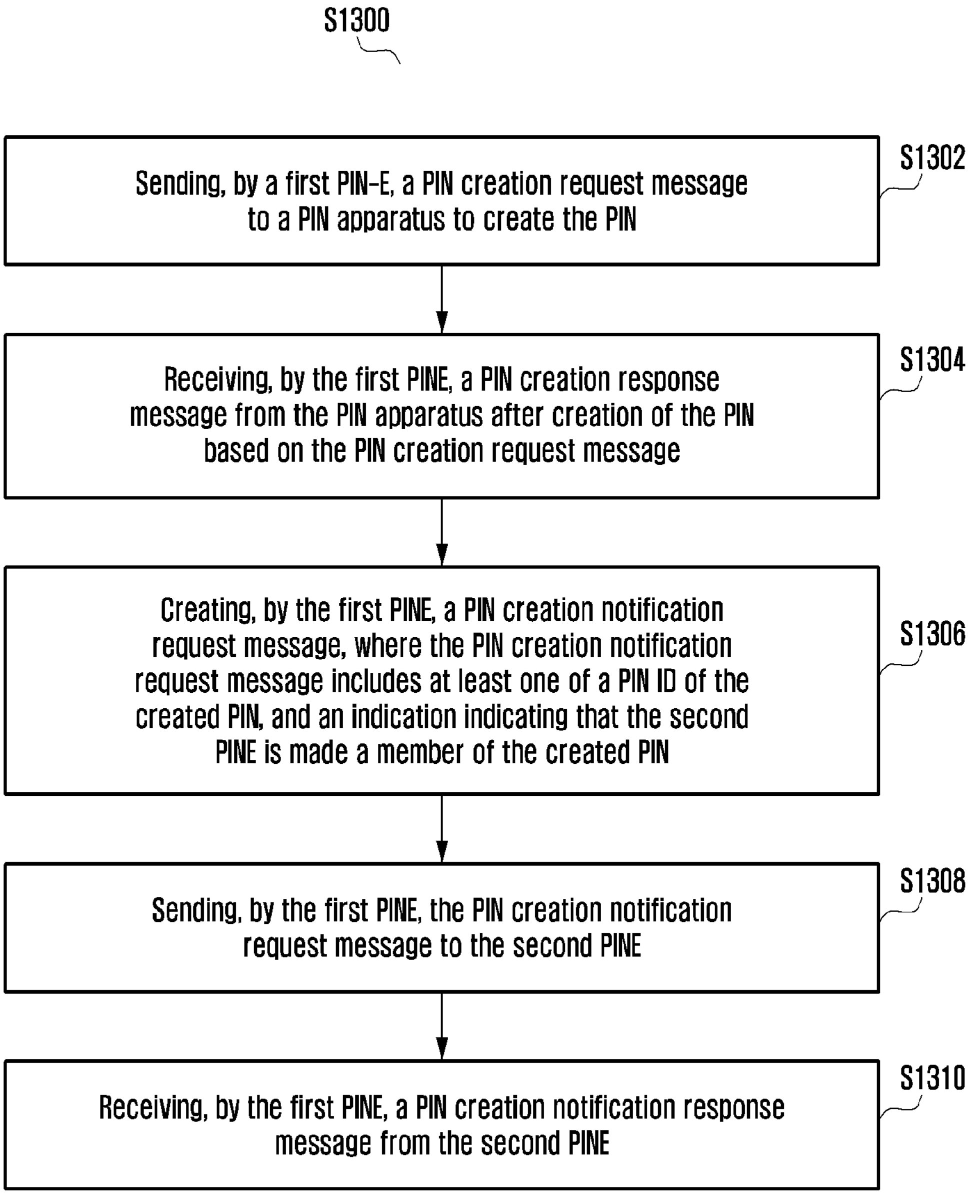
FIG. 13 illustrates a method, implemented by the PIN-E, for supporting implicit joining in the PIN, according to the embodiments as disclosed herein.

FIG. 13 illustrates a method (S1300) implemented by the PIN-E, for supporting implicit joining in the PIN (300), according to the embodiments as disclosed herein. The operations (S1302-S1310) are handled by the implicit join support controller (940).

At S1302, the method includes sending the PIN creation request message to the PIN apparatus (1000) to create the PIN. At S1304, the method includes receiving the PIN creation response message from the PIN apparatus (1000) after creation of the PIN based on the PIN creation request message. At S1306, the method includes creating the PIN creation notification request message. The PIN creation notification request message includes the PIN ID of the created PIN, and the indication indicating that the second PINE is made a member of the created PIN. At S1308, the method includes sending the PIN creation notification request message to the second PINE. At S1310, the method includes receiving the PIN creation notification response message from the second PINE.

Based on the proposed method, the PIN elements can avoid the execution of redundant procedures of the PIN discovery procedure and the PIN join procedure. Hence, the proposed method avoids the unnecessary resource usage.

Figure 14:
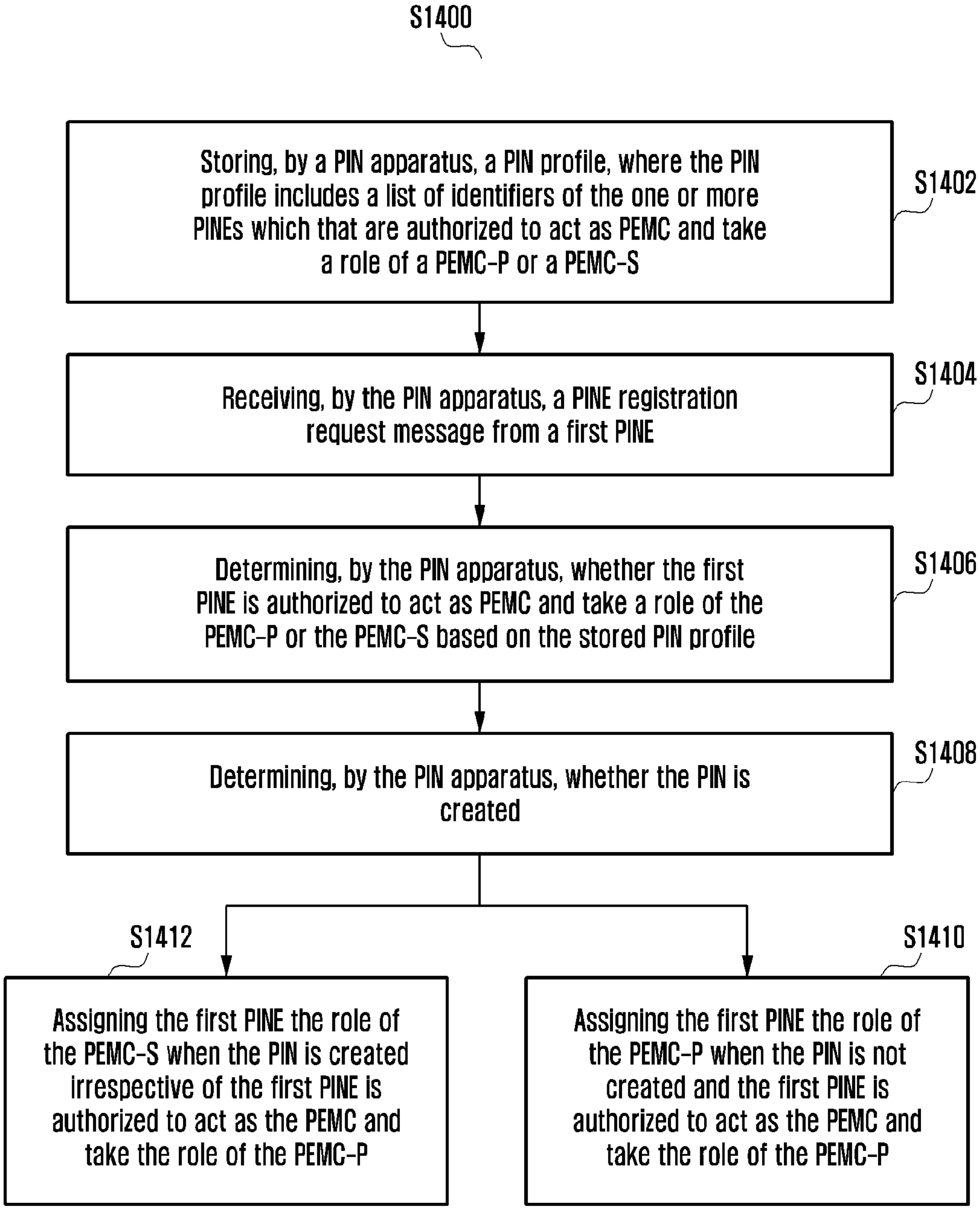
FIG. 14 illustrates a method, implemented by the PIN apparatus, for supporting multiple PEMC as part of PIN management in the PIN, according to the embodiments as disclosed herein.

FIG. 14 illustrates a method (S1400) implemented by the PIN apparatus (1000), for supporting multiple PEMC as part of PIN management in the PIN (300), according to the embodiments as disclosed herein. The operations (S1402-S1412) are handled by the multiple PEMC support controller (1040).

At S1402, the method includes storing the PIN profile. The PIN profile includes the list of identifiers of the one or more PINEs which that are authorized to act as PEMC and take a role of the PEMC-P (100*f*) (i.e., PEMC-P (100F)) or the PEMC-S (100*e*) (i.e., PEMC-S (100E)). At S1404, the method includes receiving the PINE registration request message from the first PINE. At S1406, the method includes determining whether the first PINE is authorized to act as PEMC and take a role of the PEMC-P (100F) or the PEMC-S (100E) based on the stored PIN profile. At S1408, the method includes determining whether the PIN is created. At S1410, the method includes assigning the first PINE the role of the PEMC-P (100F) when the PIN is not created and the first PINE is authorized to act as the PEMC and take the role of the PEMC-P (100F). At S1412, the method includes assigning the first PINE the role of the PEMC-S (100E) when the PIN is created irrespective of the first PINE is authorized to act as the PEMC and take the role of the PEMC-P (100F).

Figure 15:
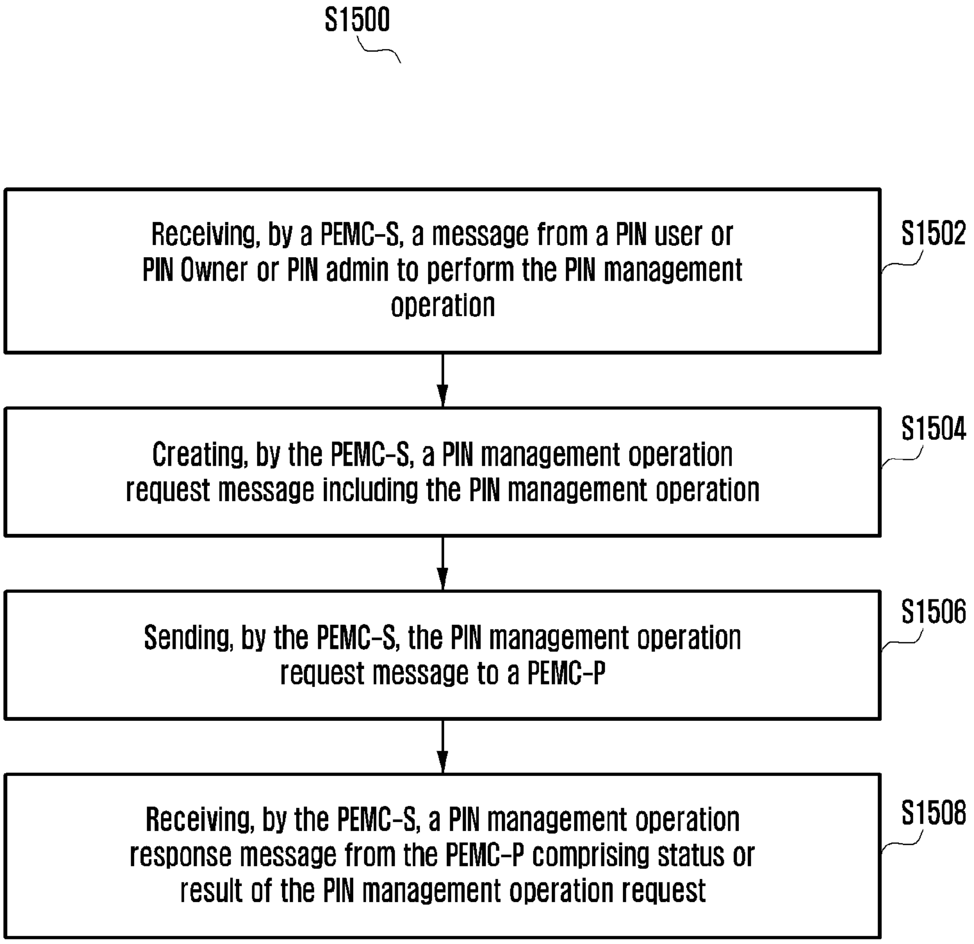
FIG. 15 illustrates a method, implemented by the PEMC-S, for supporting multiple PEMC as part of PIN management in the PIN, according to the embodiments as disclosed herein.

FIG. 15 illustrates a method (S1500) implemented by the PEMC-S (100E), for supporting multiple PEMC as part of PIN management in the PIN (300), according to the embodiments as disclosed herein. The operations (S1502-S1508) are handled by the multiple PEMC support controller (1140).

At S1502, the method includes receiving a message from the PIN user or the PIN owner or the PIN admin to perform the PIN management operation. At S1504, the method includes creating the PIN management operation request message including the PIN management operation. At S1506, the method includes sending the PIN management operation request message to the PEMC-P (100F). At S1508, the method includes receiving the PIN management operation response message from the PEMC-P (100F) comprising status or result of the PIN management operation request.

Figure 16:
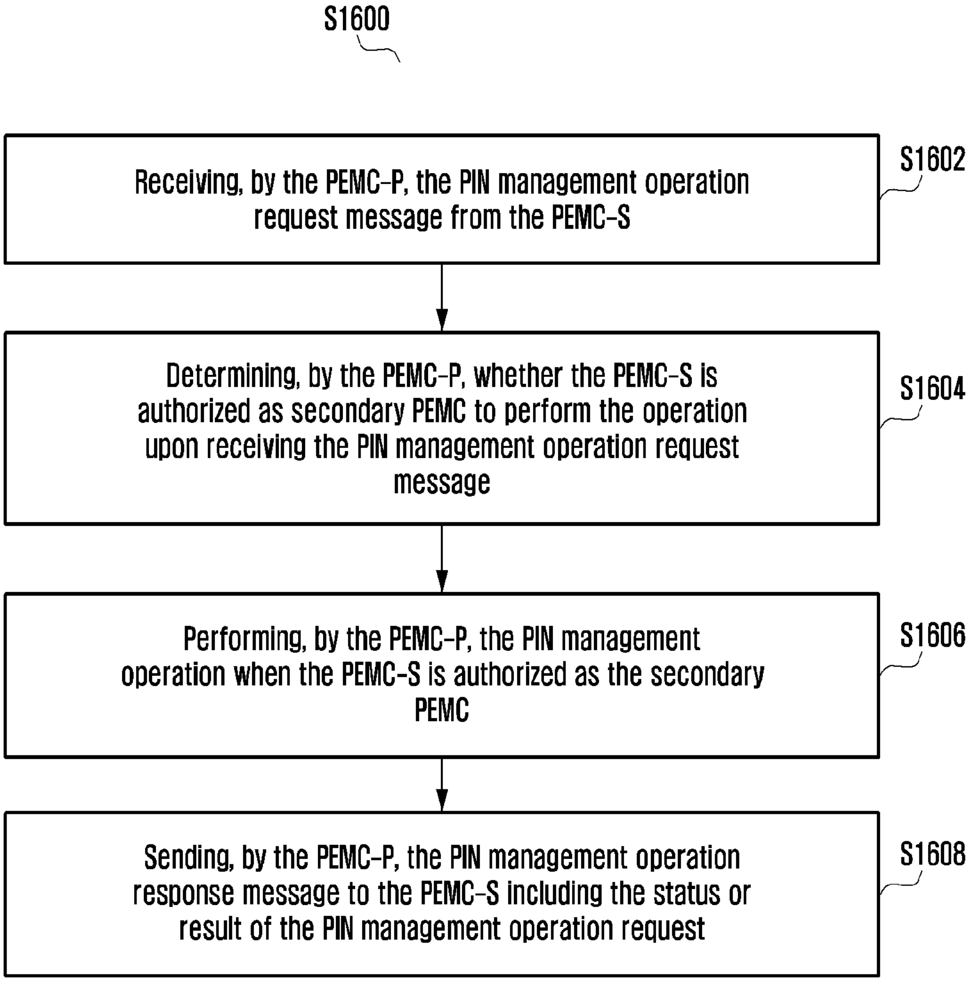
FIG. 16 illustrates a method, implemented by the PEMC-P, for supporting multiple PEMC as part of PIN management in the PIN, according to the embodiments as disclosed herein.

FIG. 16 illustrates a method (S1600) implemented by the PEMC-P (100F), for supporting multiple PEMC as part of PIN management in the PIN (300), according to the embodiments as disclosed herein. The operations (S1602-S1608) are handled by the multiple PEMC support controller (1240).

At S1602, the method includes receiving the PIN management operation request message from the PEMC-S (100E). At S1604, the method includes determining whether the PEMC-S (100E) is authorized as the PEMC-S (100*e*) to perform the operation upon receiving the PIN management operation request message. At S1606, the method includes performing the PIN management operation when the PEMC-S (100E) is authorized as the PEMC-S (100*e*). At S1608, the method includes sending the PIN management operation response message to the PEMC-S (100E) including the status or result of the PIN management operation request.

Based on the proposed method, each PEMC is assigned with the primary PEMC or the secondary PEMC. Also, the proposed method is clearly specified what actions and procedures can be executed by the primary PEMC and the secondary PEMC. Any operations related to the PIN management like creation deletion of PIN, modification deletion of PIN and the deletion of PIN, authorizing the PIN elements, de-authorizing the PIN elements, removing the PIN elements from PIN etc., should be performed and managed by only one PEMC. All other PEMCs shall not be allowed to perform PIN management operation. Though the PIN is allowed to contain only one active PEMC, the secondary PEMCs can be used by the PIN user or PIN owner to perform certain PIN management operations. The PIN owner/PIN admin need not always use the UE containing the PEMC which is designated as active to perform certain PIN management operations. For example in case of a multi-story building, the active PEMC might be in any floor and the PIN owner may require to manage the PIN using a PEMC UE which is accessible easily to him/her.

The proposed method can be implemented in case of larger PIN like hospitals, recreation center where more than one PEMC is required for efficient management of the PIN by the PIN admin or the PIN owner. Though, only PIN element can be assigned with the role of primary PEMC the PIN admin/owner is more or less transparent to this limitation and the PIN admin or the PIN owner can use the secondary PEMC to perform most of the PIN management operations. The PIN owner or PIN admin do not have to run to the primary PEMC equipment to always perform the PIN management operations.

The various actions, acts, blocks, steps, or the like in the flow charts (S1300 to S1600) may be performed in the order presented, in a different order or simultaneously. Further, in some embodiments, some of the actions, acts, blocks, steps, or the like may be omitted, added, modified, skipped, or the like without departing from the scope of the present disclosure.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first personal internet of things (IoT) network (PIN) element (PINE), the method comprising:

transmitting, to a PIN server, a PIN creation request message including a list of second PINEs to be included in a PIN;

receiving, from the PIN server, a PIN creation response message including identifiers for second PINEs which are authorized and made as member of a created PIN;

generating a PIN creation notification request message, wherein the PIN creation notification request message comprises a PIN identifier (ID) of the created PIN, and an indication indicating that at least one second PINE is made the member of the created PIN;

transmitting, to the at least one second PINE, the PIN creation notification request message which prevents the at least one second PINE from issuing a PIN join request; and receiving, from the at least one second PINE, a PIN creation notification response message.

2. The method of claim 1, wherein the PIN creation request message further comprises at least one of:

security credentials of the at least one second PINE received during an authorization procedure, a PINE identifier comprising at least one of a Generic Public Subscription Identifier (GPSI), a PIN client ID, a PINE location, or PIN client profile information.

3. The method of claim 1, wherein the PIN creation response message further comprises:

a PIN ID of the created PIN.

4. A first personal internet of things (IoT) network (PIN) element (PINE) comprising:

a memory;

a processor; and a controller, coupled to the memory and the processor, configured to:

transmit, to a PIN server, a PIN creation request message including a list of second PINEs to be included in a PIN, receive, from the PIN server, a PIN creation response message including identifiers for second PINEs which are authorized and made as member of a created PIN, generate a PIN creation notification request message, wherein the PIN creation notification request message comprises a PIN identifier (ID) of the created PIN, and an indication indicating that at least one second PINE is made the member of the created PIN, transmit, to the at least one second PINE, the PIN creation notification request message which prevents the at least one second PINE from issuing a PIN join request, and receive, from the at least one second PINE, a PIN creation notification response message.

5. The first PINE of claim 4, wherein the PIN creation request message comprises at least one of:

security credentials of the at least one second PINE received during authorization procedure, a PINE identifier comprising at least one of a GPSI, a PIN client ID, a PINE location, or PIN client profile information.

6. The first PINE of claim 4, wherein the PIN creation response message comprises:

a PIN ID of the created PIN.

* * * * *